United States Patent
Choi

(10) Patent No.: US 10,723,363 B2
(45) Date of Patent: Jul. 28, 2020

(54) VEHICLE CONTROL DEVICE AND VEHICLE EQUIPPED WITH VEHICLE CONTROL DEVICE

(71) Applicant: LG Electronics Inc., Seoul (KR)

(72) Inventor: Heedong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 16/011,214

(22) Filed: Jun. 18, 2018

(65) Prior Publication Data

US 2019/0193749 A1 Jun. 27, 2019

(30) Foreign Application Priority Data

Dec. 27, 2017 (KR) ........................ 10-2017-0181335

(51) Int. Cl.
| | |
|---|---|
| *B60W 50/08* | (2020.01) |
| *H04W 8/22* | (2009.01) |
| *H04W 4/40* | (2018.01) |
| *H04W 4/80* | (2018.01) |
| *G05D 1/00* | (2006.01) |
| *H04W 36/30* | (2009.01) |

(Continued)

(52) U.S. Cl.
CPC ........... *B60W 50/08* (2013.01); *G05D 1/0088* (2013.01); *H04L 67/12* (2013.01); *H04L 69/14* (2013.01); *H04W 4/40* (2018.02); *H04W 4/80* (2018.02); *H04W 8/22* (2013.01); *H04W 36/305* (2018.08); *B60W 2530/00* (2013.01); *G05D 2201/0213* (2013.01); *H04W 88/04* (2013.01)

(58) Field of Classification Search
CPC ... B60W 50/08; B60W 2560/00; H04L 69/14; H04L 67/12; H04W 36/305; H04W 4/80; H04W 4/40; H04W 8/22; H04W 88/04; G05D 1/0088; G05D 2201/0213

See application file for complete search history.

(56) References Cited

U.S. PATENT DOCUMENTS 9,363,710 B1 * 6/2016 Ganesh ................ H04W 28/20
2016/0099876 A1 4/2016 Oezdemir et al.
(Continued)

FOREIGN PATENT DOCUMENTS

| EP | 2690846 | 1/2014 |
|---|---|---|
| EP | 2916190 | 9/2015 |

(Continued)

OTHER PUBLICATIONS

Extended European Search Report in European Appln. No. 18206420. 4, dated Apr. 10, 2019, 10 pages.

*Primary Examiner* — Anne Marie Antonucci
(74) *Attorney, Agent, or Firm* — Fish & Richardson P.C.

(57) ABSTRACT

Provided is a vehicle control device that is installed in a vehicle that is equipped with a display, including: a proximity communication module configured to perform communication with one or more terminals that are positioned inside of the vehicle; and a processor configured to select any one terminal from among the one or more terminals according to a preset reference, in which the processor controls the proximity communication module in such a manner that communication with a communication device which is positioned outside of the vehicle is performed using a wide area communication module that is installed in the selected terminal.

20 Claims, 21 Drawing Sheets

(51) Int. Cl.
 *H04L 29/08* (2006.01)
 *H04L 29/06* (2006.01)
 *H04W 88/04* (2009.01)

(56) References Cited

U.S. PATENT DOCUMENTS

2017/0192428 A1 7/2017 Vogt et al.
2018/0198900 A1* 7/2018 Schachter ............... H04M 1/04

FOREIGN PATENT DOCUMENTS

| | | |
|---|---|---|
| JP | 2015017366 | 1/2015 |
| KR | JP2011093465 | 5/2011 |
| KR | 1020160136591 | 11/2016 |
| KR | 1020170054044 | 5/2017 |
| WO | WO2016210181 | 12/2016 |

\* cited by examiner

FIG. 1
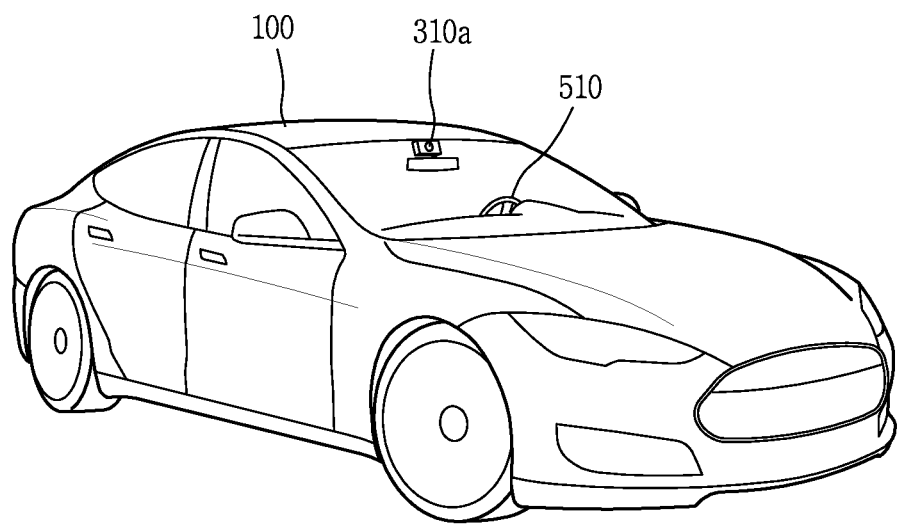
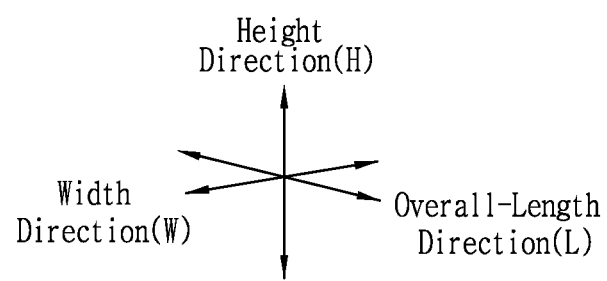

FIG. 14
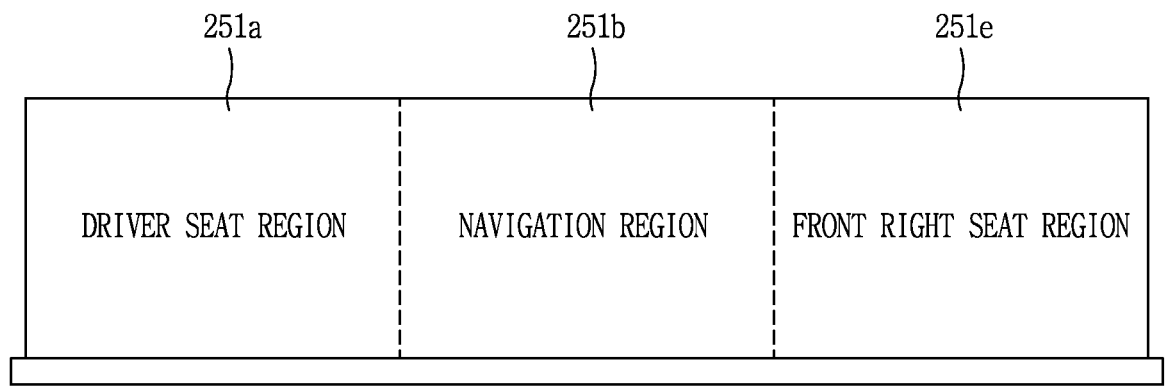
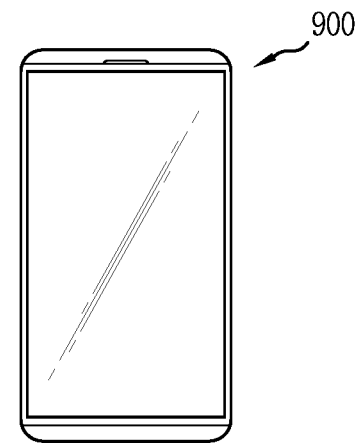
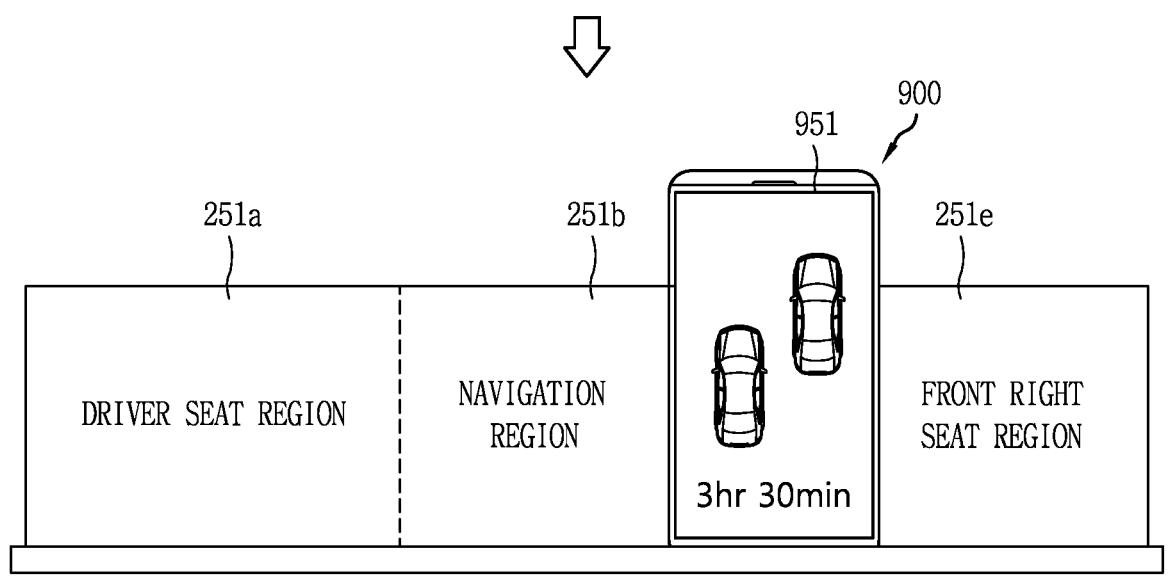

FIG. 15B
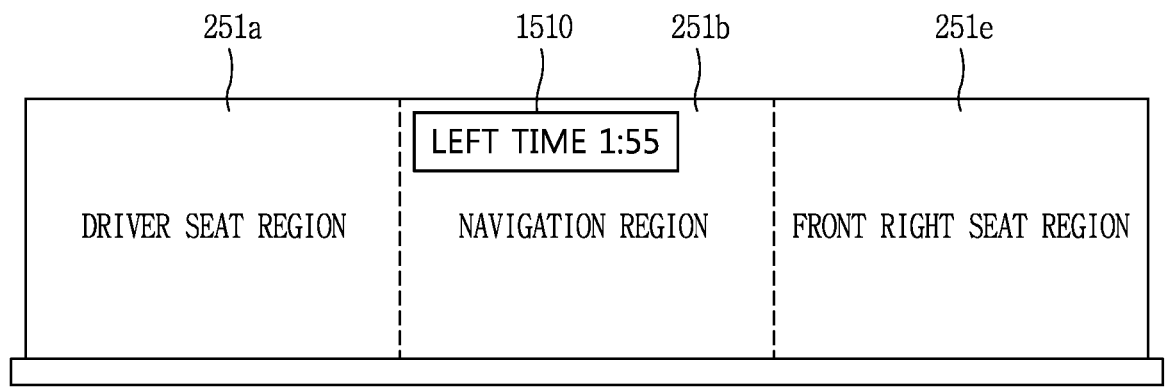
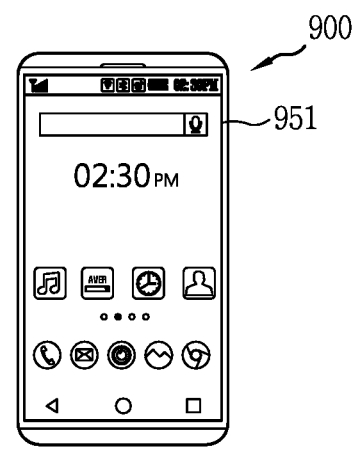

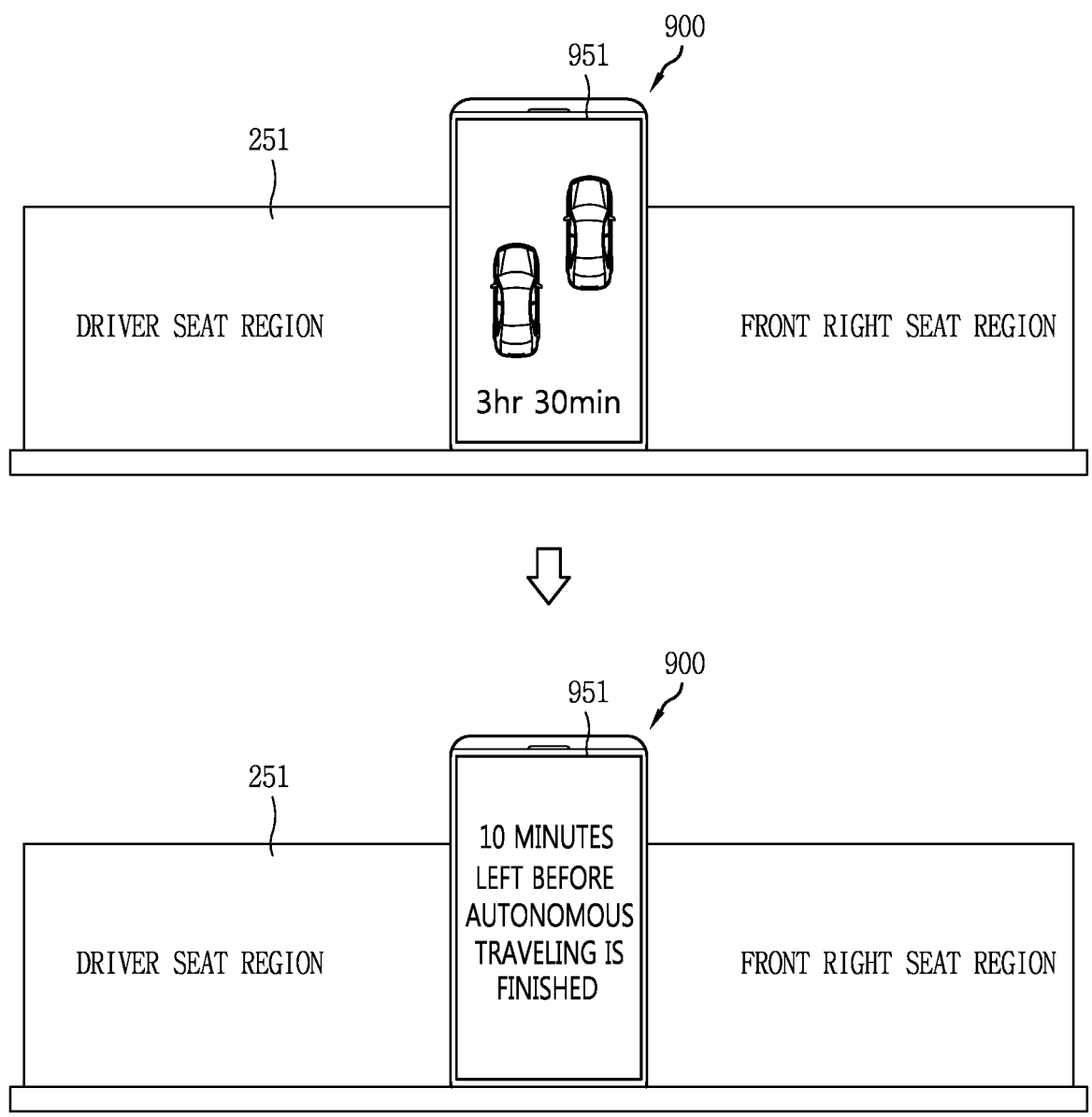

FIG. 18B
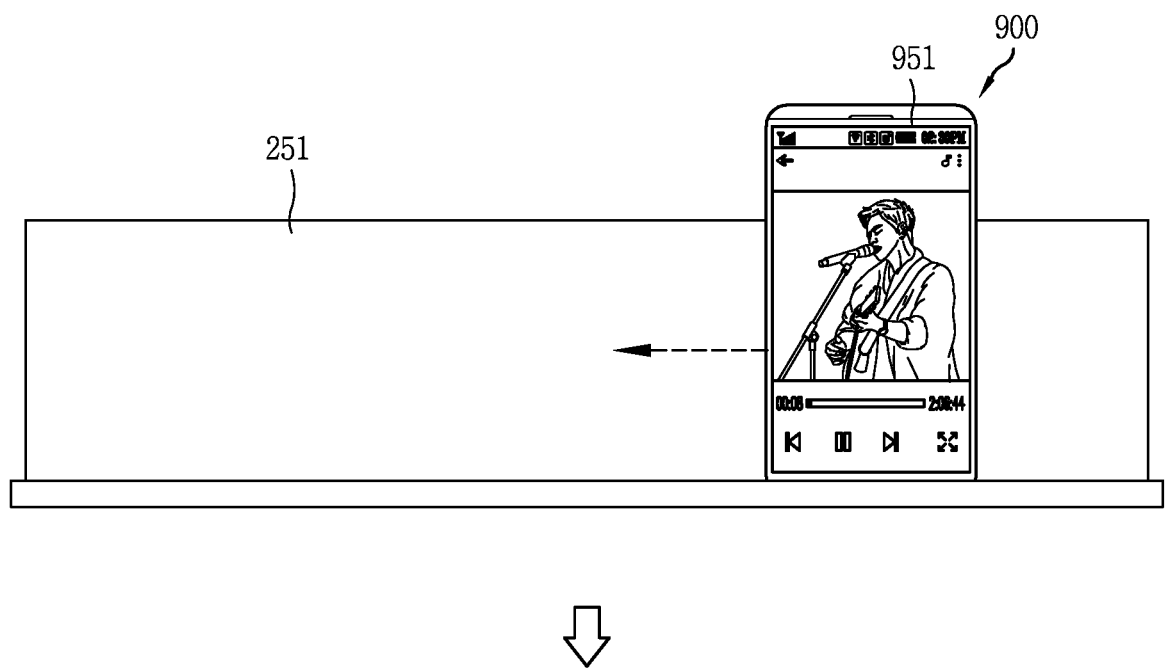
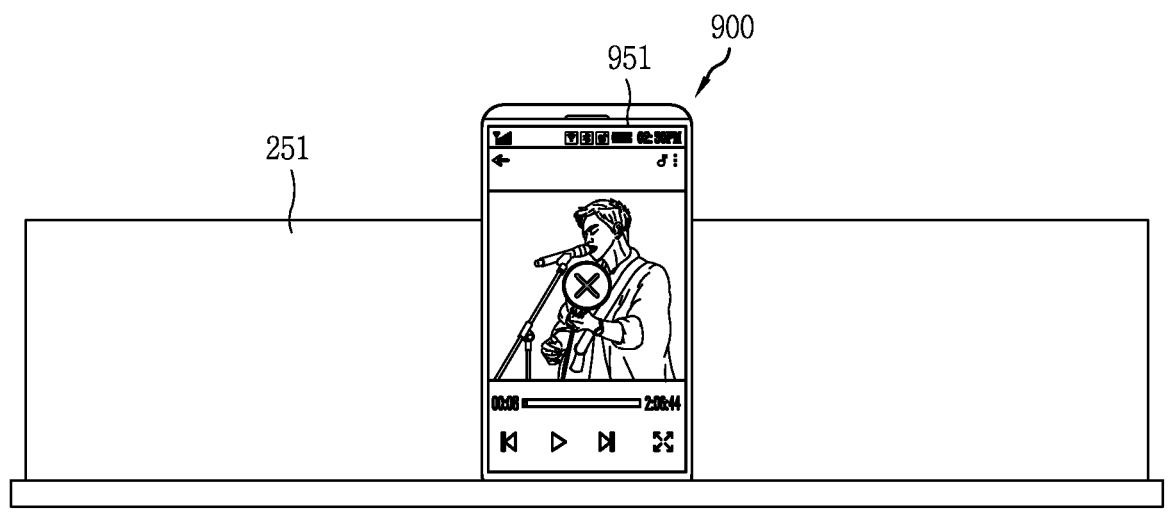

VEHICLE CONTROL DEVICE AND VEHICLE EQUIPPED WITH VEHICLE CONTROL DEVICE

CROSS-REFERENCE TO RELATED APPLICATION

Pursuant to 35 U.S.C. § 119(a), this application claims the benefit of an earlier filing date of and the right of priority to Korean Application No. 10-2017-0181335, filed on Dec. 27, 2017, the contents of which are incorporated by reference herein in its entirety.

BACKGROUND OF THE INVENTION

1. Field of the Invention

The present disclosure relates to a vehicle control device that is capable of performing communication at least one processor that is mounted in a vehicle and a vehicle that is equipped with the vehicle control device.

2. Background of the Invention

A vehicle is a mobile machine with an internal combustion engine that transports people or cargo. Typical examples of the vehicle include automobiles and motorcycles.

To ensure the safety of a user of the vehicle and provide the convenience of driving the vehicle, the vehicle is equipped with various sensors and devices, and thus has a rich variety of functions.

The functions are divided into convenience functions for providing the convenience of driving the vehicle and safety functions for ensuring the safety of a driver and/or a pedestrian.

First, the convenience function is to provide information and entertainment to the user of the vehicle when driving the vehicle, to support semi-autonomous traveling, to help with blind spot observation, and obstacle and pedestrian detection when driving on a night, driving on a rainy day, and driving through fog, and so forth. For example, there are functions associated with active cruise control (ACC), a smart parking assist system (SPAS), night vision (NV), head up display (HUD), an around view monitor (AVM), an adaptive headlight system (AHS), and so forth.

The safety function is associated with technologies for ensuring the safety of a driver and/or a pedestrian. For example, there are functions associated with a lane departure warning system (LDWS), a lane keeping assist system, (LKAS), an autonomous emergency braking (AEB), and so forth.

Communication-related technologies specified to the vehicle has been developed in order to further advance the convenience function and the safety function described above. The communication-related technologies include a vehicle-to-infrastructure (V2) technology for communication between a vehicle and an infrastructure, a vehicle-to-vehicle technology for communication between vehicles, and a vehicle-to-everything technology for communication between a vehicle and an object.

A new-manufactured vehicle is factory-equipped with a communication module to which new communication-related technologies are applied, in the manufacturing plant. Thus, the vehicle has various convenience functions and safety functions that are realized by the communication-related technologies. However, there is a problem in that a user of the existing vehicle that was already manufactured without being factory-equipped with the communication module is not provided with the convenience functions and safety functions that are realized by the communication-related technologies.

SUMMARY OF THE INVENTION

An object of the present disclosure is to provide a vehicle control device that is capable of providing various convenience functions and safety functions with the highest priority being placed on the safety of a person in a vehicle and a vehicle that is equipped with the vehicle control device.

Another object of the present disclosure is to provide a vehicle control device that is capable of providing various functions and pieces of information using communication-related technologies specified to a vehicle even in a case where a user of a vehicle did not purchase a separate communication module, and a vehicle that is equipped with the vehicle control device.

Still another object of the present disclosure is to provide a vehicle control device that is capable of performing autonomous traveling using a terminal of a person who rides in a vehicle even in the vehicle that is equipped with a communication module for the autonomous traveling, and a vehicle that is equipped with the vehicle control device.

The present disclosure relates to a vehicle control device that is installed in a vehicle that is equipped with a display.

According to an embodiment of the present disclosure, there is provided a vehicle control device that is installed in a vehicle that is equipped with a display, including: a proximity communication module configured to perform communication with one or more terminals that are positioned inside of the vehicle; and a processor configured to select any one terminal from among the one or more terminals according to a preset reference, in which the processor controls the proximity communication module in such a manner that communication with a communication device which is positioned outside of the vehicle is performed using a wide area communication module that is installed in the selected terminal.

In the vehicle control device according to the embodiment, the one or more terminals may include a first terminal and a second terminal, and while the communication with the communication device is being performed using the wide area communication module that is installed in the first terminal, in a case where a pre-defined state where the communication is not able to be performed using the first terminal is detected, the processor may control the proximity communication module in such a manner that the communication with the communication device is performed using a wide area communication module that is installed in the second terminal instead of the first terminal.

According to the embodiment, the processor may control the proximity communication module in such a manner that a function which is performed using the first terminal is continuously performed by the second terminal in a seamless way.

According to the embodiment, the processor may control the proximity communication module in such a manner that information which is received from the first terminal is transmitted to the second terminal before using the second terminal. Because the existing information that is received from the first terminal is also transmitted to the second terminal, the second terminal can perform synchronization of information that is to be transmitted to the vehicle control device.

According to the embodiment, in a case where the pre-defined state is no longer available, the processor may control the proximity communication module in such a manner that the communication with the communication device is performed using a wide area communication module that is installed in the first terminal instead of the second terminal.

According to the embodiment, the processor may control the proximity communication module in such a manner that performing of at least one function is limited in the second terminal. This is in order to make a preparation in such a manner that the second terminal is always ready for operating as the communication module of the vehicle control device.

According to the embodiment, the processor may calculate an amount of data per unit time, which is communicated using a wide area communication module of the first terminal, and, in a case where the calculated amount of communicated data is greater than a reference, the processor may control the proximity communication module in such a manner that the communication with the communication device is performed using both the wide area communication module of the first terminal and the wide area communication module of the first terminal.

According to the embodiment, the processor may assign a communication identifier in such a manner that the selected terminal performs communication with another processor that is installed in the vehicle.

According to the embodiment, the processor may control the proximity communication module in such a manner that at least one among functions that are being performed in the selected terminal is interrupted.

According to the embodiment, in a case where a first function is performed, the processor may select a first terminal from among the one or more terminals, according to a first reference that is set for the first function, and in a case where a second function is performed, the processor may select a second terminal that is different from the first terminal, from among the one or more terminals, according to a second reference that is set for the second function.

According to the embodiment, the processor may generate an autonomous traveling command using information that is received from the selected terminal, in such a manner that the vehicle travels autonomously.

According to the embodiment, the processor may calculate the available autonomous traveling time for which the autonomous traveling by the vehicle is possible using the selected terminal, based on the information that is received from the selected terminal, and the processor may control the proximity communication module in such a manner that time information indicating the calculated time to the display.

According to the embodiment, in a case where the selected terminal is changed from the first terminal to the second terminal, the available autonomous traveling time may be recalculated based on information that is received from the second terminal, and the time information may be updated with the recalculated time.

According to the embodiment, while the vehicle is traveling autonomously, in a case where a pre-defined state where information is not able to be received from the selected terminal is detected, the processor may control the proximity communication module in such a manner that alert information which alerts that the autonomous traveling is finished is output to the display.

According to the embodiment, a cradle that is configured to hold the one or more terminals in place may be installed in the vehicle, and the processor may selectively generate the autonomous traveling command, according to whether or not the selected terminal is held in place in the cradle.

According to the embodiment, the processor may control the proximity communication module in such a manner that the selected terminal is kept held in place in the cradle while the autonomous traveling command is being generated.

According to the embodiment, in a case where the selected terminal is not held in place in the cradle, the processor may control the proximity communication module in such a manner that warning information which warns the selected terminal is held in place in the cradle is output to the display.

According to the embodiment, the processor may control the proximity communication module in such a manner that performing of at least one function is limited in the terminal while the autonomous traveling command is being generated.

According to the embodiment, the processor may select any one terminal from among the one or more terminals based on at least one of the following: a communication speed of each terminal, an amount of available data, and an amount of available battery power.

An effect of a vehicle control device according to the present disclosure and a vehicle that is equipped with the vehicle control device is described as follows.

The vehicle control device according to the present disclosure causes a vehicle to serve as a vehicle that provides a V2V function and/or a V2X function, using a communication network of a terminal that is positioned inside of the vehicle.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a diagram illustrating an appearance of a vehicle according to an embodiment of the present disclosure;

FIG. 14 is a diagram illustrating an example of operations that are performed in a case where the terminal is placed in the cradle in FIG. 12;

FIGS. 15A and 15B are diagrams for describing an example of operations that are performed in a case where the terminal that is placed in the cradle is released from the cradle;

FIG. 16 is a diagram for describing an example of operations that are performed in a case where a state that is pre-defined is detected in the terminal that operates as a communication module of the vehicle;

FIGS. 18A and 18B are diagrams for describing an example of a method of controlling the terminal in different ways according to the position in which the terminal is placed.

DETAILED DESCRIPTION OF THE INVENTION

Figure 2:
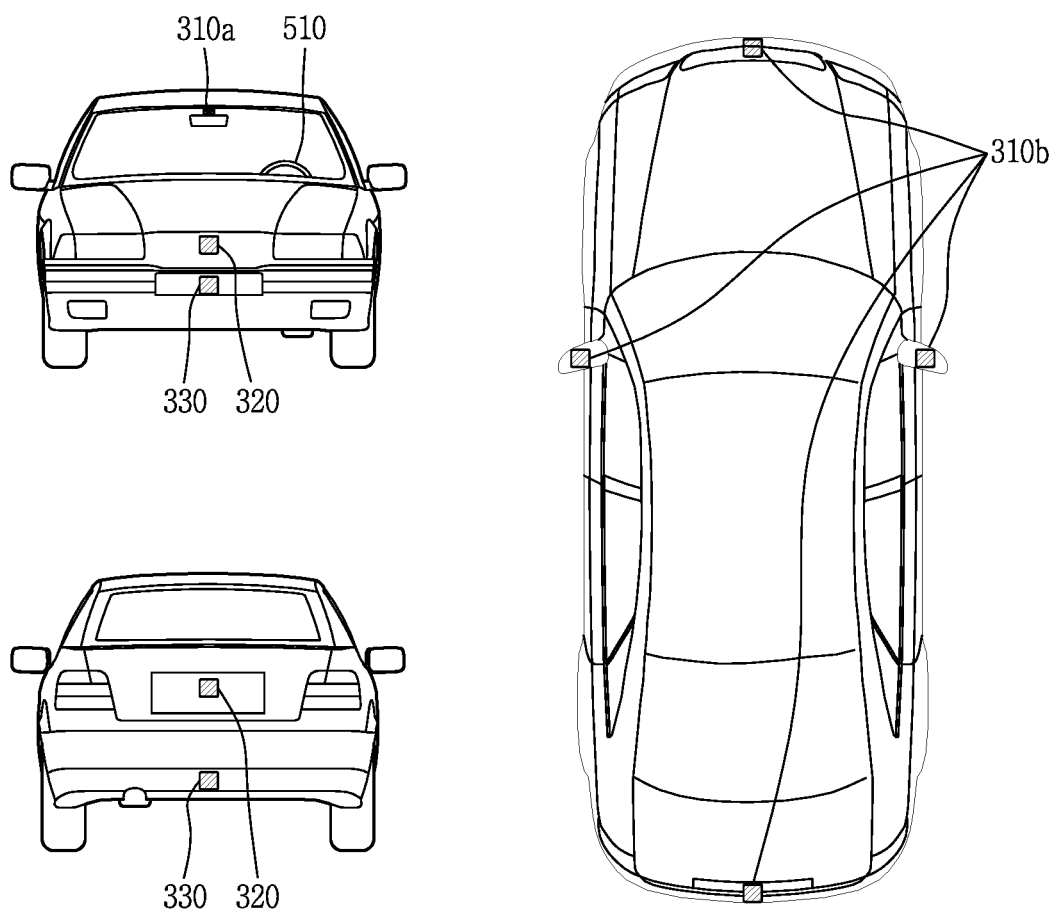
FIG. 2 is a diagram illustrating the vehicle according to the embodiment of the present disclosure, when viewed from various angles.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an embodiment of the present invention.

FIG. 2 is a view illustrating appearance of a vehicle at various angles in accordance with an embodiment of the present invention.

Figure 3:
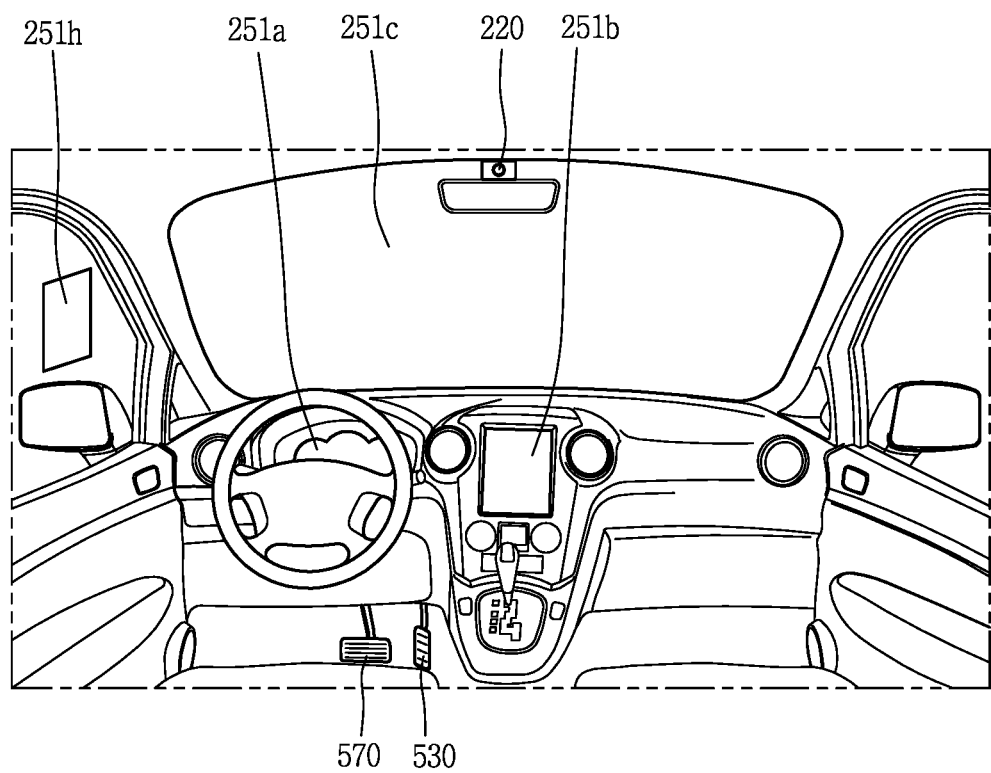
FIGS. 3 and 4 are diagrams illustrating the inside of the vehicle according to the embodiment of the present disclosure.
Figure 4:
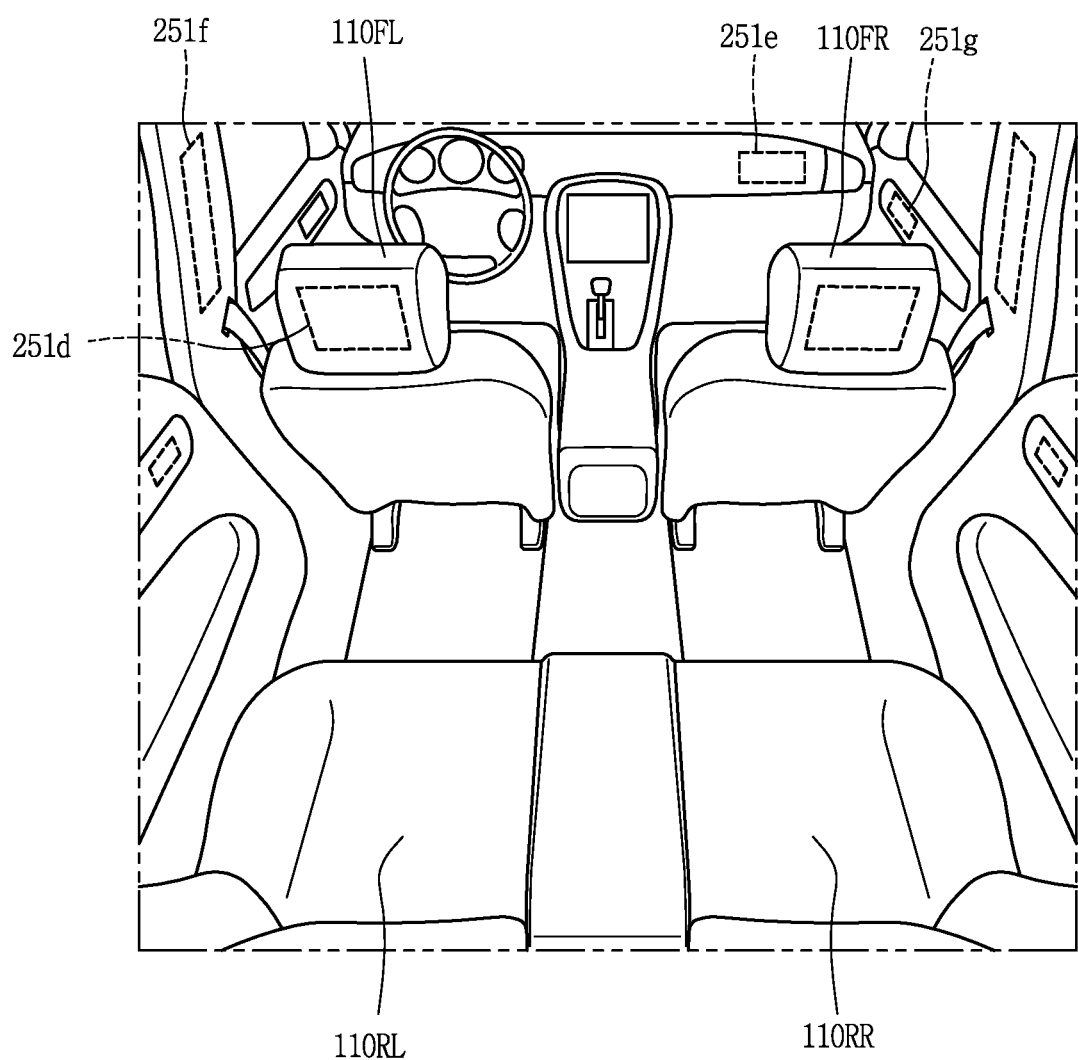

FIGS. 3 and 4 are views illustrating an inside of a vehicle in accordance with an embodiment of the present invention.

Figure 5:
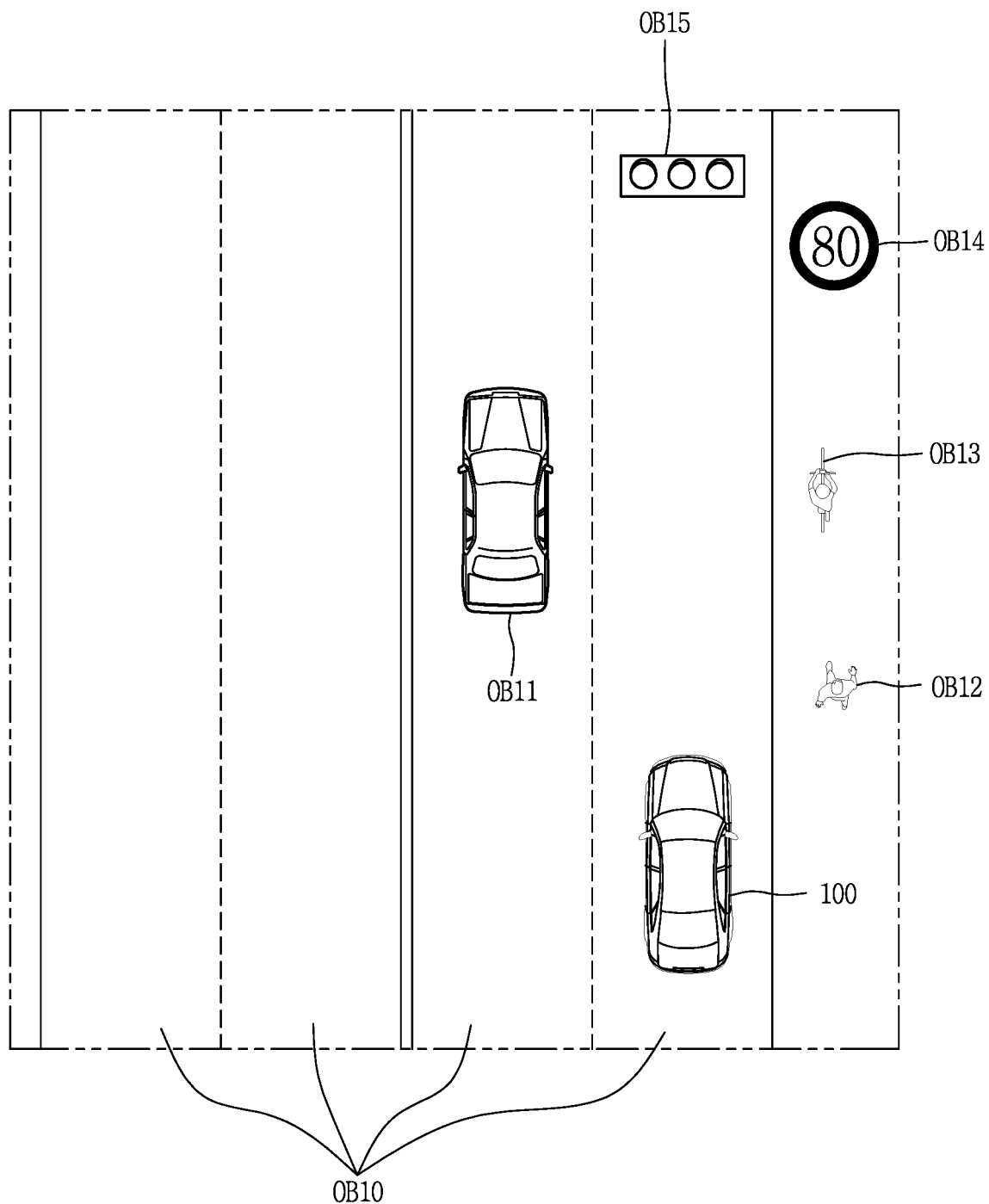
FIGS. 5 and 6 are diagrams that are referred to for describing an object according to the embodiment of the present disclosure.
Figure 6:
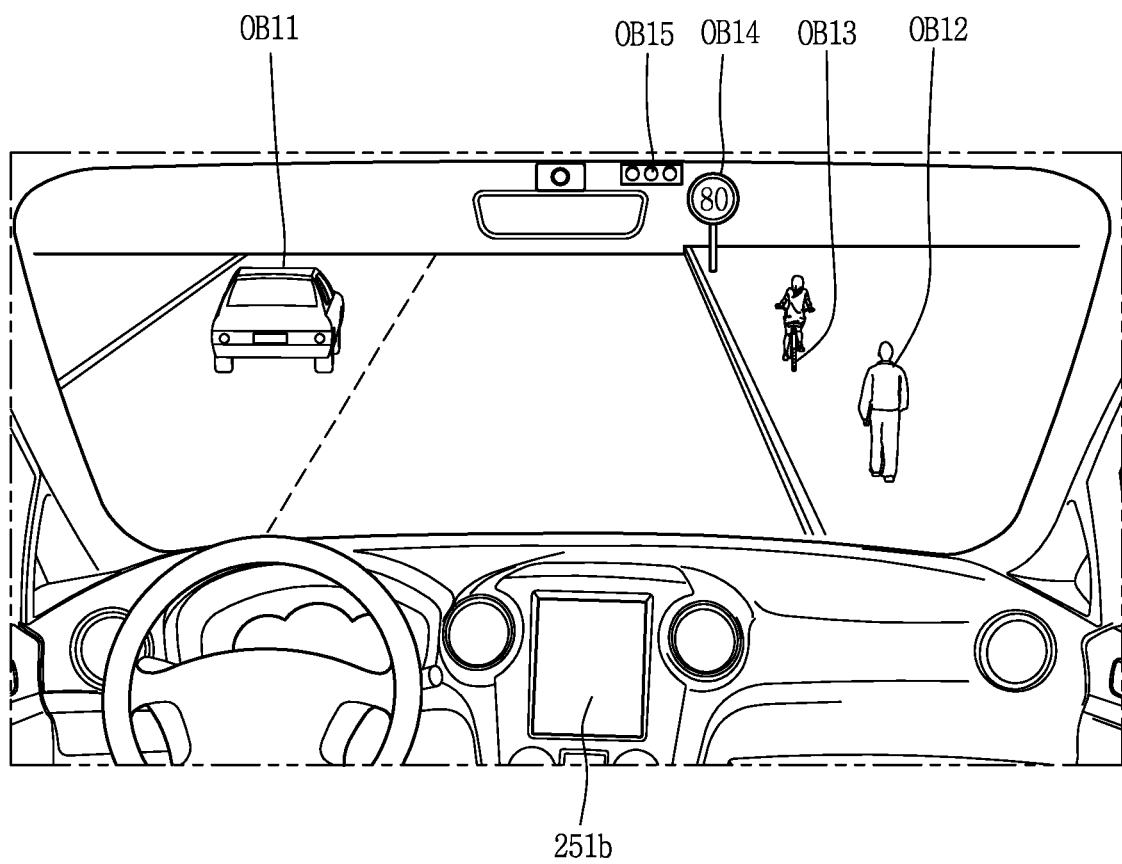

FIGS. 5 and 6 are reference views illustrating objects in accordance with an embodiment of the present invention.

Figure 7:
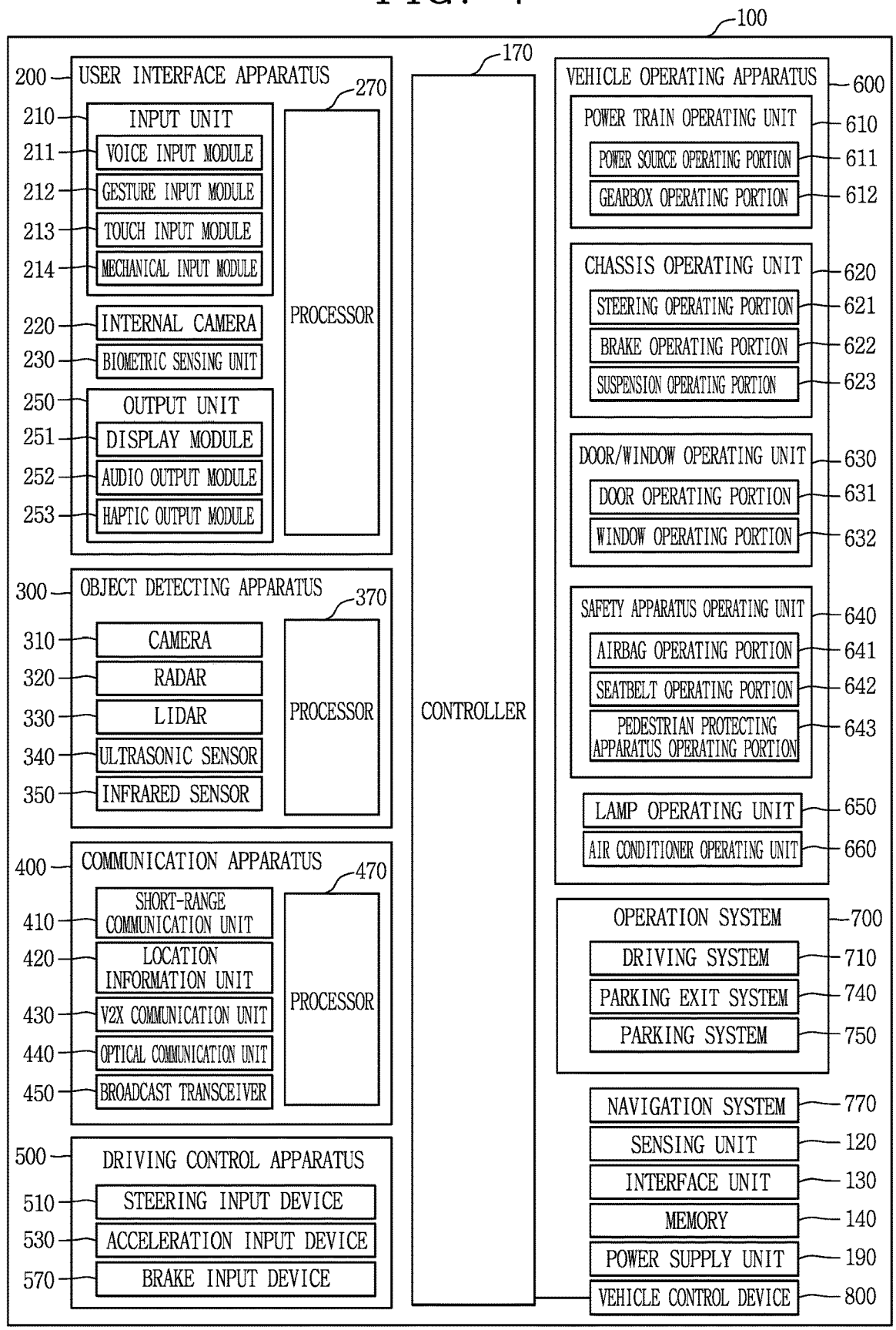
FIG. 7 is a block diagram that is referred to for describing the vehicle according to the embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100.

For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal.

When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

A vehicle control device 800 that is to be installed in the vehicle 100 will be described in detail below.

The vehicle control device 800, which is to be installed in the vehicle 100, is configured to be an independent device that is detachably attached to the vehicle 100, or is a constituent element of the vehicle 100 that is integrally combined with the vehicle 100.

For description convenience, the vehicle control device 800 will be described below as being configured to be independent of the controller 170 of the vehicle 100. However, this configuration is only one embodiment of the present disclosure. All operations of the vehicle control device 800 and all methods of controlling the vehicle control device 800 may be performed by the controller 170 of the vehicle 100. That is, an operation and/or a control method that are performed by a processor 830 of the vehicle control device 800 are performed by the controller 170 of the vehicle 800.

Figure 8:
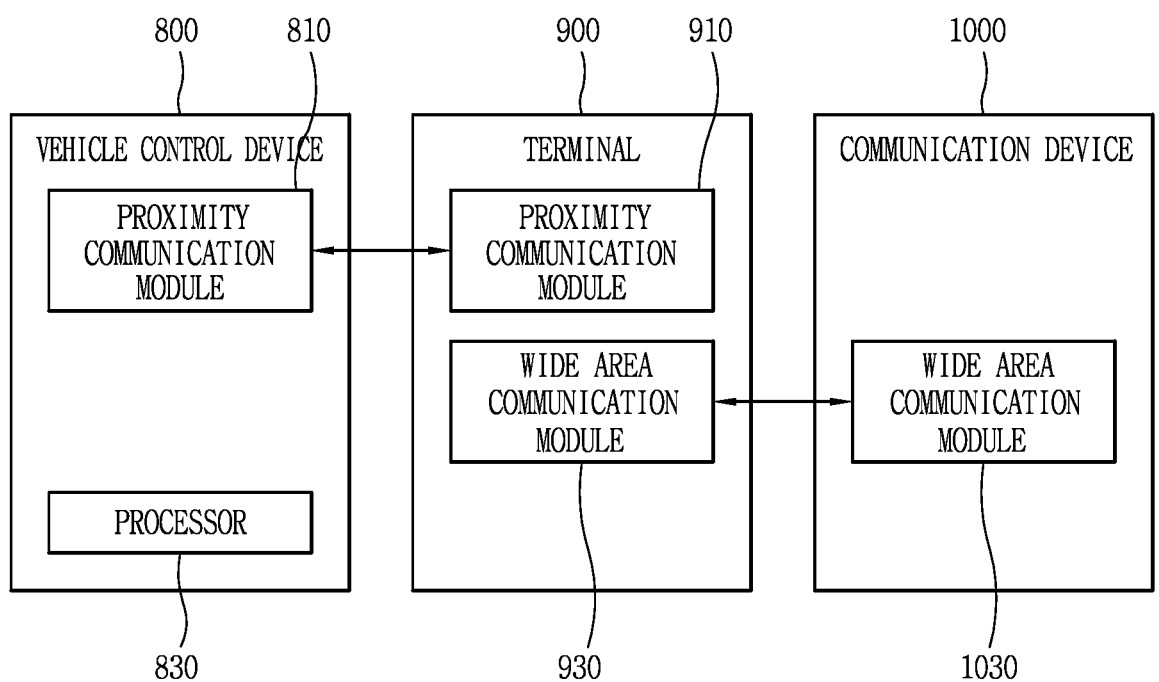
FIG. 8 is a block diagram for describing the vehicle control apparatus in FIG. 7 in more detail.

FIG. 8 is a block diagram for describing the vehicle control apparatus in FIG. 7 in more detail.

With reference to FIG. 8, the vehicle control device 800 includes a proximity communication module 810 and the processor 830.

The proximity communication module 810 is configured to perform wired and wireless communications with the various constituent elements that are described with reference to FIG. 7. As an example, the proximity communication module 810 receives various pieces of information that are provided through a controller area network (CAN).

The proximity communication module 810 performs communication with a terminal that is positioned within a predetermined distance from a vehicle. For example, the processor 830 searches for a terminal that is positioned inside of the vehicle 100 and performs the communication with the found terminal using the proximity communication module 810. In other words, the proximity communication module 810 is configured to perform the communication with one or more terminals that are positioned inside of the vehicle 100.

The proximity communication module 810 is a device that is capable of performing the communication with the terminal that is positioned inside of the vehicle 100. No limitation is imposed on a method of performing the communication. For example, the proximity communication module 810 may perform the communication in a wired manner or may perform the communication in a wireless manner using various communication standards such as Bluetooth or WiFi.

The term "proximity" in the proximity communication module 810 is a relative term, and means a shorter distance than does the term "wide area" in a wide area communication module 930 or 1030 that will be described below. In other words, it is assumed that the proximity communication module 810 can perform the communication with the terminal that is positioned inside of the vehicle 100, but that the proximity communication module 810 cannot perform other communication devices that are positioned outside of the vehicle 100. It is assumed that the proximity communication module 810 cannot perform the communication with other communication devices which are positioned outside of the vehicle 100 due to a restriction of a communication-available range or a restriction of an available communication standard.

The proximity communication module 810 receives information relating to vehicle's traveling from most of the devices that are installed in the vehicle 100. The information that is transmitted from the vehicle 100 to the vehicle control device 800 is referred to as vehicle traveling information.

The vehicle traveling information includes vehicle information and vicinity-of-a-vehicle information. When a body of the vehicle 100 is used as a reference, information relating to the inside of the vehicle is defined as the vehicle information and information relating to the outside of the vehicle is defined as the vicinity information.

The vehicle information means information relating to the vehicle itself. For example, pieces of vehicle information include a traveling speed of the vehicle, a traveling direction of the vehicle, acceleration of the vehicle, an angular speed of the vehicle, a location (GPS) of the vehicle, a weight of the vehicle, the number of people on board, braking power of the vehicle, maximum braking power of the vehicle, pneumatic pressure of each of the wheels of the vehicle, a centrifugal force that is applied to the vehicle, a traveling mode (an autonomous traveling mode or a manual traveling mode) of the vehicle, a parking mode (an autonomous parking mode, an automatic parking mode, or a manual parking mode) of the vehicle, information as to whether or not a user rides in the vehicle, and information relating to the user.

The vicinity information means information relating to an object that is positioned within a predetermined from the vehicle, and information relating to the outside of the vehicle. For example, pieces of vicinity information include a state (a frictional force) of a road on which the vehicle is traveling, weather, a distance to a preceding (or following) vehicle, a relative speed of the preceding (or following) vehicle, a curvature of a curve in a case where a lane on which the vehicle is traveling is curved, the brightness of an area in the vicinity of the vehicle, information relating to an object that is present within a reference area (fixed area) from the vehicle, information as to whether an object moves into or out of the fixed area, information as to whether a user is present in the vicinity of the vehicle, information relating to the user (for example, information as to whether or not the user is an authenticated user).

In addition, the pieces of vicinity information include ambient brightness, ambient temperature, a sun position, information (a person, another vehicle, a road sign, or the like) relating to an object that is positioned in the vicinity of the vehicle, a type of road on which the vehicle is traveling, a geographic feature, information relating to lines marked on a road on which the vehicle travels, and vehicle-traveling lane information, and information necessary for an autonomous traveling, autonomous parking, automatic parking, or manual parking mode.

In addition, the pieces of vicinity information further include a distance from the vehicle 100 to an object present in the vicinity of the vehicle 100, the likelihood of colliding with the object, a type of the object, a parking space that is available for parking the vehicle, an object (for example, a marked parking line, a string indicating the parking space, a parked vehicle, a wall, or the like) for identifying the parking space.

The pieces of vehicle traveling information are not limited to the examples described above, and include all pieces of information that are generated from constituent elements that are installed in the vehicle 100.

On the other hand, the processor 830 is configured to control one or more displays, which are installed in the vehicle 100, using the proximity communication module 810.

Specifically, based on the vehicle traveling information that is received through the proximity communication module 810, the processor 830 determines whether or not, among a plurality of conditions that are preset, at least one condition is satisfied. According to the condition that is satisfied, the processor 830 controls the one or more displays in different ways.

Regarding the preset condition, the processor 830 detects that an event occurs in electronics and/or an application that are installed in the vehicle 100, and determines whether or not the detected event satisfies the preset condition. At this time, the processor 830 may detect that the event occurs, from information that is received through the proximity communication module 810.

The applications conceptually include a widget and a home launcher and are meant to include all types of programs that are possibly executed in the vehicle 100. Therefore, the application may be a web browser or a program that performs moving image reproduction, message transmission and reception, scheduling, or application update.

Furthermore, the application includes at least one of the following: forward collision warning (FCW), blind spot detection (BSD), lane departure warning (LDW), pedestrian detection (PD), curve speed warning (CSW), and turn-by-turn navigation (TBT).

For example, the event occurs in a case where there is a missed call, in a case where an application that is a target for update is present, in a case where a message arrives, in a case where a vehicle starts on or starts off, in a case where an autonomous traveling mode is turned on or off, in a case where an LCD awake key is held down, in a case where there is an alarm, an incoming call, a missed notification, and the like.

As another example, the event occurs in a case where a warning that is set in an advanced driver assistance system (ADAS) occurs or where a function that is set in the ADAS is performed. For example, the event is regarded as occurring, in a case where the forward collision warning occurs, in a case where a backward sideways warning (the blind spot detection) occurs, in a case where the lane departure warning occurs, in a case where a lane keeping assist warning occurs, and in a case where autonomous emergency braking is performed.

As another example, the event is also regarded as occurring, in a case where gear shifting from a forward gear to a reverse gear is performed, in a case where acceleration that is greater than a predetermined value occurs, or in a case where a power generation apparatus is changed from an internal combustion engine to a motor or from the motor to the internal combustion engine.

In addition, the event is also regarded as occurring, in a case where various ECUs that are installed in the vehicle 100 perform specific functions. In a case where the event that occurred satisfies a preset condition, the processor 830 controls the proximity communication module 810 in such a manner that information corresponding to the satisfied condition is displayed on one or more displays.

Based on the vehicle traveling information, the processor 830 generates an autonomous traveling command in such a manner that the vehicle 100 autonomously travels. For example, the autonomous traveling command is generated in such a manner that, although a driver does not correspondingly drive a vehicle, according to an algorithm, a traveling direction is changed, a speed is changed, or braking is performed.

On the other hand, in order to ensure safer autonomous traveling, information needs to be received from various communication devices that are positioned outside of the vehicle 100, and information that is generated inside of the vehicle 100 needs to be corrected or synchronized using the received information. This is because a physical restriction of a memory that is installed inside of the vehicle 100 is always present, there is always a likelihood that an error will occur, and so forth.

In order to perform communication with a communication device that is positioned outside of the vehicle 100, a mobile communication service, like one in the field of telematics, needs to be provided. There is a problem in that a communication module for providing the mobile communication service is installed in order to providing the mobile communication service.

In a state where the communication module that provides the mobile communication service is not provided, the vehicle control device 800 according to the present disclosure performs communication with various communication devices 1000 that are positioned outside of the vehicle 100, using a terminal 900 that is positioned inside of the vehicle 100. In other words, the vehicle control device 800 uses the terminal 900, which is positioned inside of the vehicle 100, as a relay means of, or a communication means of providing the mobile communication service.

The "terminal 900" is hereinafter defined as a device that is positioned inside of the vehicle 100 and performs communication through the proximity communication module 810 of the vehicle control device 800.

The terminals 900 include a portable phone, a smartphone, a laptop computer, a digital-broadcast-dedicated terminal, a personal digital assistant (PDA), a portable multimedia player (PMP), a navigation system, a slate PC, a tablet PC, a high-end subnotebook computer such as an Ultrabook (a registered trademark) subnotebook computer, and a wearable device (for example, a watch-type terminal (smart watch), a glass-type terminal (smart glass), or a head mounted display (HMD)).

The "communication device 1000" is defined as a device that is positioned outside of the vehicle 100 and performs communication with the vehicle control device 800 through the terminal 900.

The communication devices 1000 include all devices that are positioned outside of the vehicle 100 and performs the communication. For example, the terminal 900, when positioned outside of the vehicle 100, corresponds to the communication device 1000. In addition, a communication base station, a server, a vehicle, a traffic signal lamp, or the like corresponds to the communication device 1000.

The terminal 900 includes a proximity communication module 910 and a wide area communication module 930. The proximity communication module 910 is configured to perform the communication with the vehicle control device 800, and the wide area communication module 930 is configured to perform communication with the communication device 1000. The proximity communication module 910 and the wide area communication module 930 may be arranged, as different modules, inside of the terminal 900, or may be integrally realized as a single chip.

The communication device 1000 includes a wide area communication module 1030 and performs communication with the terminal 900 using the wide area communication module 1030.

Operation of the vehicle control device 800 will be described in more detail below with reference to the accompanying drawings.

Figure 9:
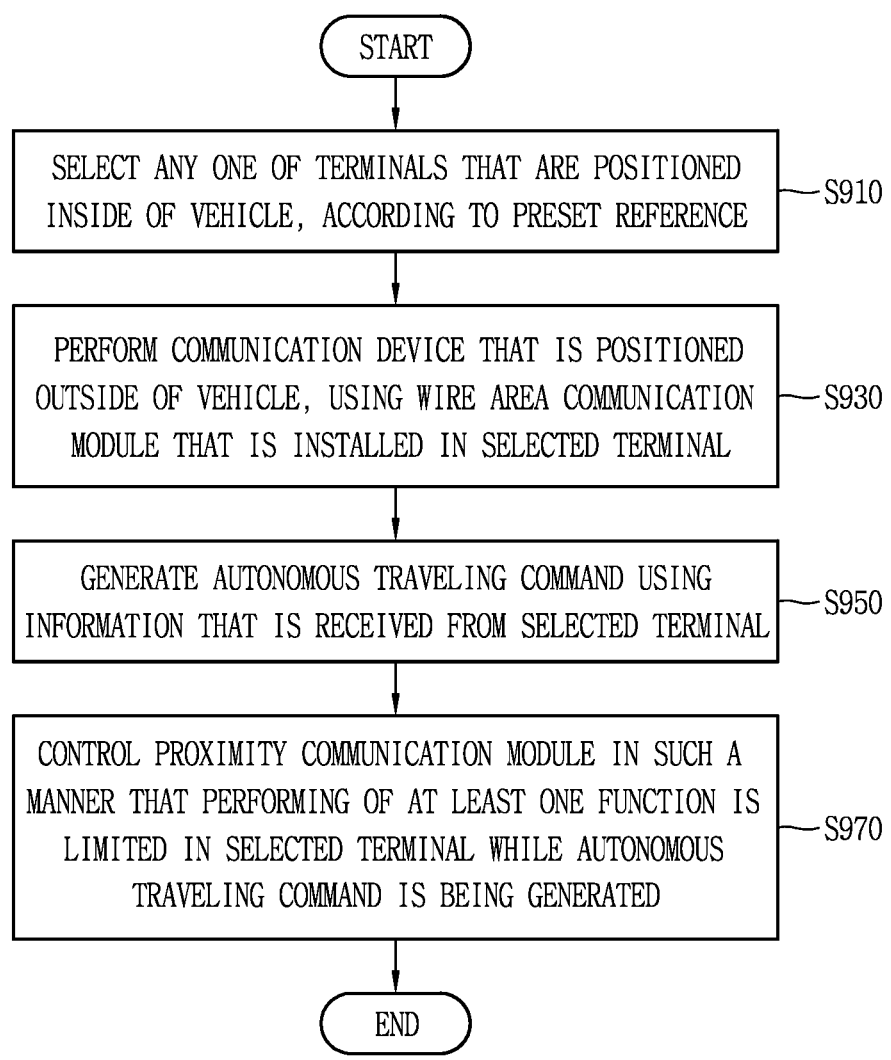
FIG. 9 is a flowchart for describing a method of controlling the vehicle control device according to an embodiment of the present disclosure.

FIG. 9 is a flowchart for describing a method of controlling the vehicle control device according to an embodiment of the present disclosure.

The processor 830 of the vehicle control device 800 selects any one terminal from among terminals that are positioned inside of the vehicle 100, according to a preset reference.

The processor 830 searches for one or more terminals that are positioned inside of the vehicle 100. Then, any one terminal is selected from among the found terminals according to the preset reference.

The processor 830 calculates an evaluation value for each terminal based on one or more evaluation factors that are set according to the preset reference, and selects at least one terminal, the calculated evaluation value for which is greater than a reference evaluation value.

The evaluation factors include a communication speed of each terminal, an amount of available data, an amount of available battery power, a position of each terminal that is placed inside of the vehicle 100, a size of a display that is installed in each terminal, and an interworking history of the vehicle control device 800.

The reference evaluation value varies according to a traveling environment where the vehicle 100 is traveling. The traveling environment relates to a speed of the vehicle 100, properties of a road on which the vehicle 100 is traveling, and weather. For example, when it is sunny, the reference evaluation value is a first value, and when it rains, the reference evaluation value changes to a second value that is higher than the first value. This is in order to increase a value of a reference for selecting a terminal to provide the safer autonomous traveling.

A process of selecting any one of the terminals is performed periodically, occasionally, or in real time. Although the same terminals are positioned inside of the vehicle 100, which one of the same terminals is selected depends on a point in time when the selection is performed.

For example, in a case where an amount of available data in a first terminal is 1 TB and an amount of available data in a second terminal is 1 GB, the first terminal is selected. Subsequently, the communication with the communication device 1000 is performed through the wide area communication module that is installed in the first terminal. Due to the continuous use of the data, the amount of available data is smaller than 1 GB. In this case, the processor 830 selects the second terminal instead of the first terminal, and performs the communication with the communication device 1000 using the wide area communication module of the second terminal.

In a case where a plurality of terminals satisfy the preset condition, the plurality of terminals are possibly selected. The case where the plurality of terminals are selected will be described in detail below with reference to FIG. 10.

With reference back to FIG. 9, the processor 830 performs communication with a communication device that is positioned outside of the vehicle 100 using the wide area communication module that is installed in the selected terminal (S930).

More specifically, the processor 830 controls the proximity communication module 810 in such a manner that the communication with the communication device 1000 is performed. The terminal 900 performs the communication with the communication device 1000 using the wide area communication module 930 of the terminal 900 itself, and transmits information, as is, which is received from the communication device 1000, to the vehicle control device 800 or transmits information, which results from processing the received information in a predetermined way, to the vehicle control device 800.

The terminal 900 performs a car mode for transmitting to the vehicle control device 800 the information that is received from the communication device 1000. The car mode here means a mode for using the terminal 900 as a communication means for the vehicle control device 800, and is defined as a mode for allocating to the vehicle control device 800 the highest priority in using a resource that is available to the terminal 900.

In a case where the car mode is performed, the terminal 900 performs communication with various devices that are installed inside of the vehicle 100. The terminal 900 performs communication not only with the vehicle control device 800, but also with the various constituent elements that are described with reference to FIG. 7.

Devices that are mounted in the vehicle 100 perform communication using the controller area network (CAN) that are standardized. A data protocol is stipulated for the CAN communication, and a status field in the data protocol includes an identifier of an entity that performs communication. Only in a case where the identifier is valid, the CAN communication is performed and communication security is ensured by the identifier.

The vehicle control device 800 assigns the terminal 900 a communication identifier specific to the terminal 900 itself in such a manner that the terminal 900 possibly performs communication in compliance with the data protocol. The terminal 900 generates data for the CAN communication or selectively uses information that is received through the vehicle control device 800, using the communication identifier that is assigned to the terminal 900 itself.

The processor 830 provides various functions using information that is transmitted from the communication device 1000 and is received through the vehicle control device 800.

As an example, the processor 830 generates the autonomous traveling command in such a manner that the vehicle 100 travels autonomously, using the information that is received the selected terminal (S950).

The processor 830 instructs the terminal 900 to receive high-precision map data that supports the autonomous traveling, using the proximity communication module 810. The terminal 900 searches for a device that provides the high-precision map data, or makes a request to a preset device for the high-precision map data. At this time, a device to which the terminal 900 makes a request for the high-precision map data corresponds to the communication device 1000. The high-precision map data is transmitted to the communication device 1000, the terminal 900, and the vehicle control device 800 in this order, and the processor 830 generates the autonomous traveling command using the high-precision map data.

In addition, the processor 830 provides various functions using the information that received from the communication device 1000.

Next, the processor 830 controls the proximity communication module 810 in such a manner that, while the autonomous traveling command is being generated, performing of at least one function is limited in the selected terminal (S970).

In a case where the car mode is performed, the terminal 900 categorizes a plurality of applications that are installed in the terminal 900, into a first group that includes executable applications and a second group that includes non-executable applications. The plurality of applications may be categorized into the first group and the second group according to at least one of the following: an amount of battery power per unit time, an amount of data used and a resource occupancy rate.

Executing of an application that is included in the second group is limited even in a case where the user inputs an execution request. The terminal 900 outputs alert information that alerts the user to execution restriction at least in one of the following ways: visual, acoustic, and tactile ways.

The processor 830 controls the proximity communication module 810 in such a manner that the car mode is performed in the selected terminal and, at the same time or thereafter, at least one function among functions that are being performed in the selected terminal is interrupted. For example, when an application that is included in the second group is being executed, the car mode is performed and then execution of the application is interrupted. This is in order to manage a resource in such a manner that the terminal 900 operates as a communication means for the vehicle control device 800.

As described above, the vehicle control device 800 according to the present disclosure causes the vehicle 100 to serve as a vehicle that provides a V2V function and/or a V2X function, using a communication network of the terminal that is positioned inside of the vehicle 100.

Figure 10:
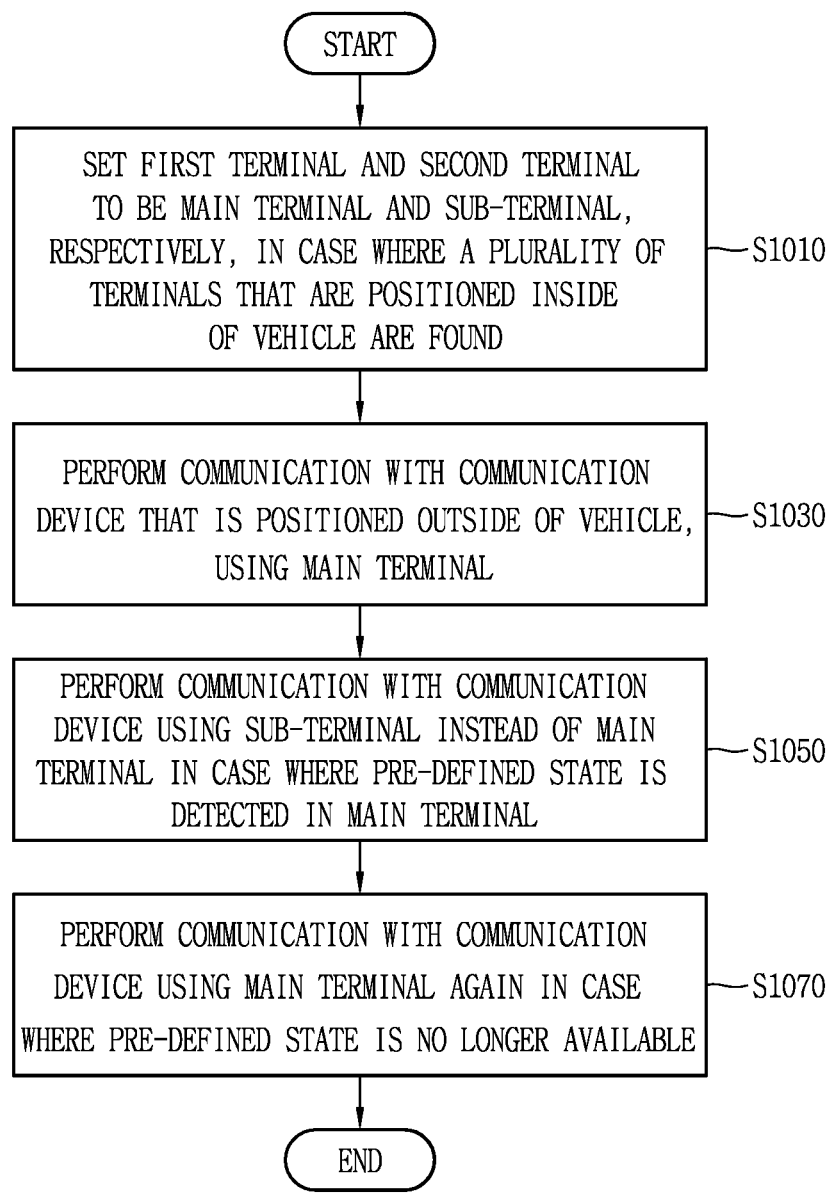
FIG. 10 is a flowchart for describing a control method in a case where a plurality of terminals are found inside of a vehicle.

FIG. 10 is a flowchart for describing a control method in a case where a plurality of terminals are found inside of the vehicle.

In the case where the plurality of terminals that are positioned inside of the vehicle are found, the first terminal and the second terminal are set to be a main terminal and a sub-terminal, respectively (S1010).

Based on one or more evaluation factors that are set for the preset reference, the processor 830 calculates an evaluation value for each terminal, sets a terminal with the first highest priority to be the main terminal, in order of decreasing a size of the calculated evaluation value, and set a terminal with the second highest priority to be the sub-terminal.

The main terminal is defined as a terminal that performs the car mode, and the sub-terminal is defined as a terminal that is on standby in order to be always ready for performing the car mode.

The processor 830 performs the communication with the communication device 1000 that is positioned outside of the vehicle 100, using the main terminal (S1030). More specifically, the proximity communication module 810 is controlled in such a manner that information is received from the communication device 1000 through a wide area communication module that is installed in the main terminal.

Next, in a case where a state that is pre-defined is detected in the main terminal, the processor 830 performs the communication with the communication device using the sub-terminal instead of the main terminal (S1050).

Specifically, the processor 830 monitors the main terminal while the communication is being performed using the main terminal. It is determined through the monitoring whether or not the main terminal reaches the pre-defined state where the communication can be performed.

The pre-defined state here refers to a case where an amount of available battery power in the main terminal is smaller than a reference amount of battery power, a case where an amount of available data in the main terminal is smaller than a reference amount of data, a case where a level of communication sensitivity of the main terminal is lower than a level of reference sensitivity, or the like. That is, the pre-defined state means a state where, using the main terminal, the autonomous traveling by the vehicle is not possible or the mobile communication service can be provided.

In a case where the pre-defined state is detected, the processor 830 controls the proximity communication module 810 in such a manner that the communication with the communication device 1000 is performed using a wide area communication module which is installed in the sub-terminal, instead of the main terminal.

The processor 830 controls the proximity communication module 810 in such a manner that a function which is performed using the main terminal is continuously performed by the sub-terminal in a seamless way. This is because temporary interruption of the reception of information that is to be received during the autonomous traveling results in a vehicle accident.

As an example, the processor 830 controls the proximity communication module 810 in such a manner that, before using the sub-terminal, information which is received from the main terminal is transmitted to the sub-terminal. The sub-terminal searches for a suitable synchronization point in time while monitoring information that is transmitted by the main terminal, and transmits the found point in time to the vehicle control device 800. At the point in time that is received from the sub-terminal, the vehicle control device 800 releases the connection to the main terminal, and performs the communication with the communication device 1000 using the sub-terminal.

As another example, the processor 830 determines a first point in time (t) at which the communication with the main terminal is finished, and calculates a second point in time (t+n) that is necessary for the sub-terminal to perform synchronization, from the first point in time (t). The processor 830 requests the communication device 1000 to transmit data that is predicted to be received from the first point in time (t) to the second point in time (t+n), until the first point in time (t). The data is received in advance and thus preparation is made for the temporary interruption of the communication.

As another example, in a case where the pre-defined state is detected in the main terminal, the processor 830 performs the communication with the communication device 1000 using both the main terminal and the sub-terminal. The processor 830 gradually increases an amount of communication with the sub-terminal, and decreases an amount of communication with the main terminal in proportion to this gradual increase, thereby ending the communication with the main terminal. For example, in a first section in which the pre-defined state is detected, a ratio of the amount of communication with the sub-terminal to the amount of communication with the main terminal is set to 9:1, and in a second that follows the first section, the ratio is set to 7:3.

The processor 830 calculates an amount of data per unit time, which is communicated uses the wide area communication module of the main terminal. In a case where the calculated amount of communicated data is greater than a maximum reference or is smaller than a minimum reference, the communication with the communication device 1000 is performed using both the wide area communication module of the main terminal and the wide area communication module of the sub-terminal. In other words, in a case where the use of only the main terminal causes the amount of communicated data to be insufficient, the processor 830 uses the sub-terminal, along with the main terminal, and thus compensates for the insufficient amount of communicated data.

The car mode is performed in the sub-terminal that is on standby before the car mode is performed, and thus an application that is being executed in the sub-terminal is automatically no longer executed. In addition, the processor 830 controls the proximity communication module 810 in such a manner that the performing of at least one function is limited in the standby state and/or in a state where the car mode is performed.

In a case where the pre-defined state is no longer available in the main terminal, the processor 830 performs the communication with the communication device 1000, resuming the use of the main terminal (S1070).

In the case where the pre-defined state is no longer available, the processor 830 controls the proximity communication module 810 in such a manner that the communication with the communication device 1000 is performed using the wide area communication module which is installed in the main terminal instead of the sub-terminal. In other words, the sub-terminal plays a role of the main terminal tentatively or temporarily, and, when the main terminal is no longer in the pre-defined state, returns to the standby state.

On the other hand, although not illustrated, in a case where a first function is performed, the processor 830 selects a first terminal from among one or more terminals, according to a first reference that is set for the first function. Furthermore, in a case where a second function is performed, the processor 830 selects a second terminal that is different from the first terminal, from among the one or more terminals, according to a second reference that is set for the second function.

According to a function that needs to be performed or is being performed, an optimal reference for a terminal that supports the function varies. The processor 830 selects any one terminal that is optimized for a function that is currently being performed, as the main terminal, using various references.

For example, the first terminal performs communication at a higher speed than a second terminal, and the second terminal has a larger display than the first terminal. The processor 830 performs the communication with the communication device using the first terminal, in a case where the communication needs to be performed at a high speed, and performs the communication with the communication device using the second terminal, in a case where the terminal needs to have a large display.

Figure 11:
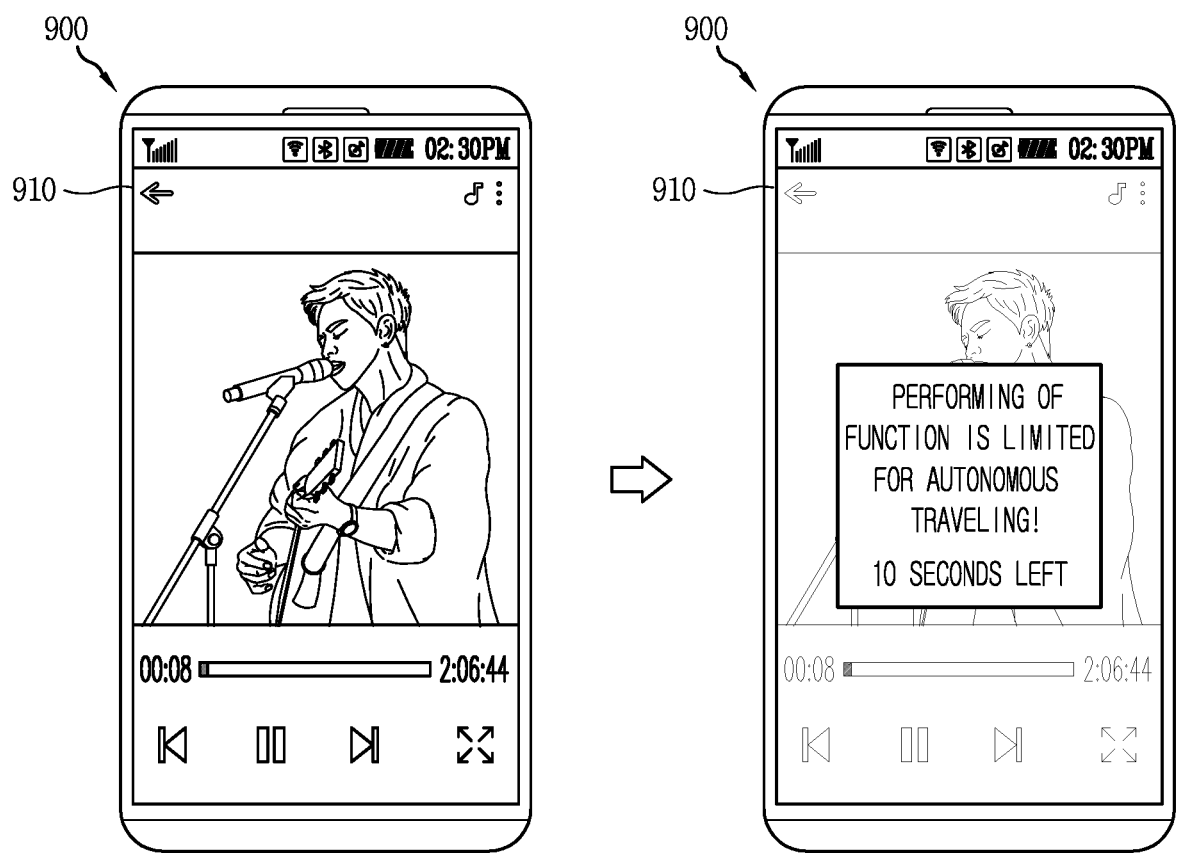
FIG. 11 is a diagram for describing an example of operation of the terminal, as a communication module of the vehicle control device, which is positioned inside of the vehicle.

On the other hand, in a situation where the sub-terminal is not present, the pre-defined state of the main terminal is detected. In this case, the processor 830 calculates time at which the autonomous traveling is possible and alerts a person who rides in the vehicle that the autonomous traveling is finished at the calculated time. In a case where it is impossible for the main terminal to provide the mobile communication service, switching to manual traveling is guided. FIG. 11 is a diagram for describing an example of operation of the terminal, as the communication module of the vehicle control device, which is positioned inside of the vehicle.

The terminal 900 performs the car mode at the request of the vehicle control device 800 while providing a function of a normal terminal.

When the car mode is performed, the performing of at least one function is limited in the terminal 900. Therefore, before performing the terminal 900 alerts the user to the time that it takes to perform the car mode, or provides detailed information on the function, the performing of which is limited.

As illustrated in FIG. 11, the terminal 900 performs the car mode at the request of the vehicle control device 800 while a moving image reproduction application is being executed. Before the car mode is performed, information which alerts the user that the executing of the moving image reproduction application is limited is output to a display 910 that is installed in the terminal 900.

In order to ensure stable communication through the terminal 900, the terminal 900 needs to be held in place to be positioned at a predetermined position. To eliminate this need, a cradle 1310 for holing the terminal 900 in place to be positioned at the predetermined position is installed inside of the vehicle 100.

The cradle 1310 and the operation of the vehicle control device 800 that uses the cradle 1310 will be described in detail below with reference to FIGS. 12, 13A, and 13B.

Figure 12:
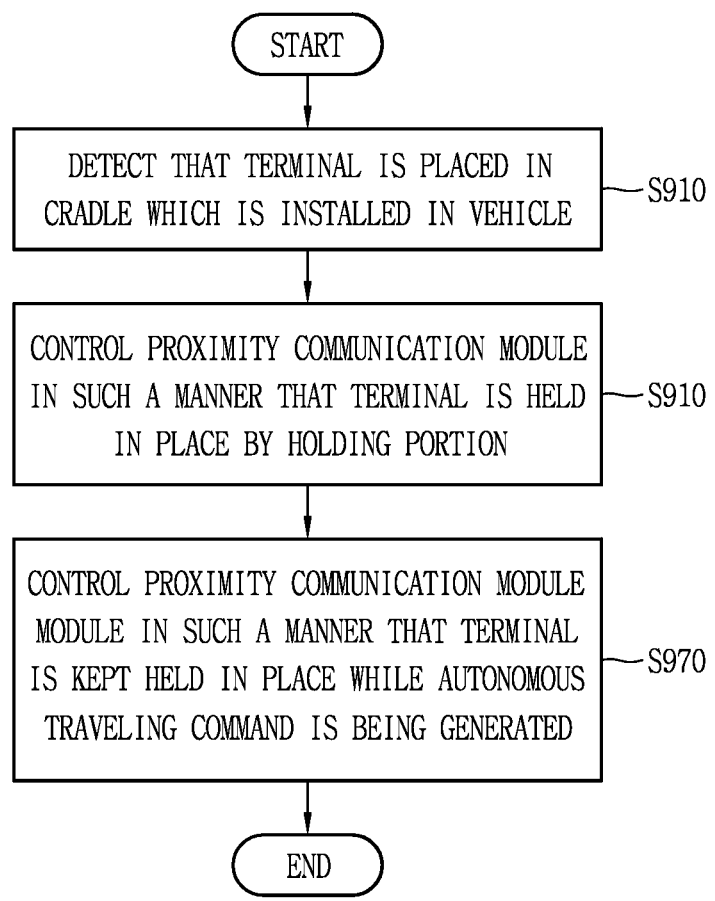
FIG. 12 is a flowchart for describing a method of controlling the vehicle control device using a cradle in which the terminal is placed.

FIG. 12 is a flowchart for describing a method of controlling the vehicle control device using the cradle in which the terminal is placed. FIGS. 13A and 13B are diagrams for describing an example of the cradle in FIG. 12 in more detail.

Figure 13A:
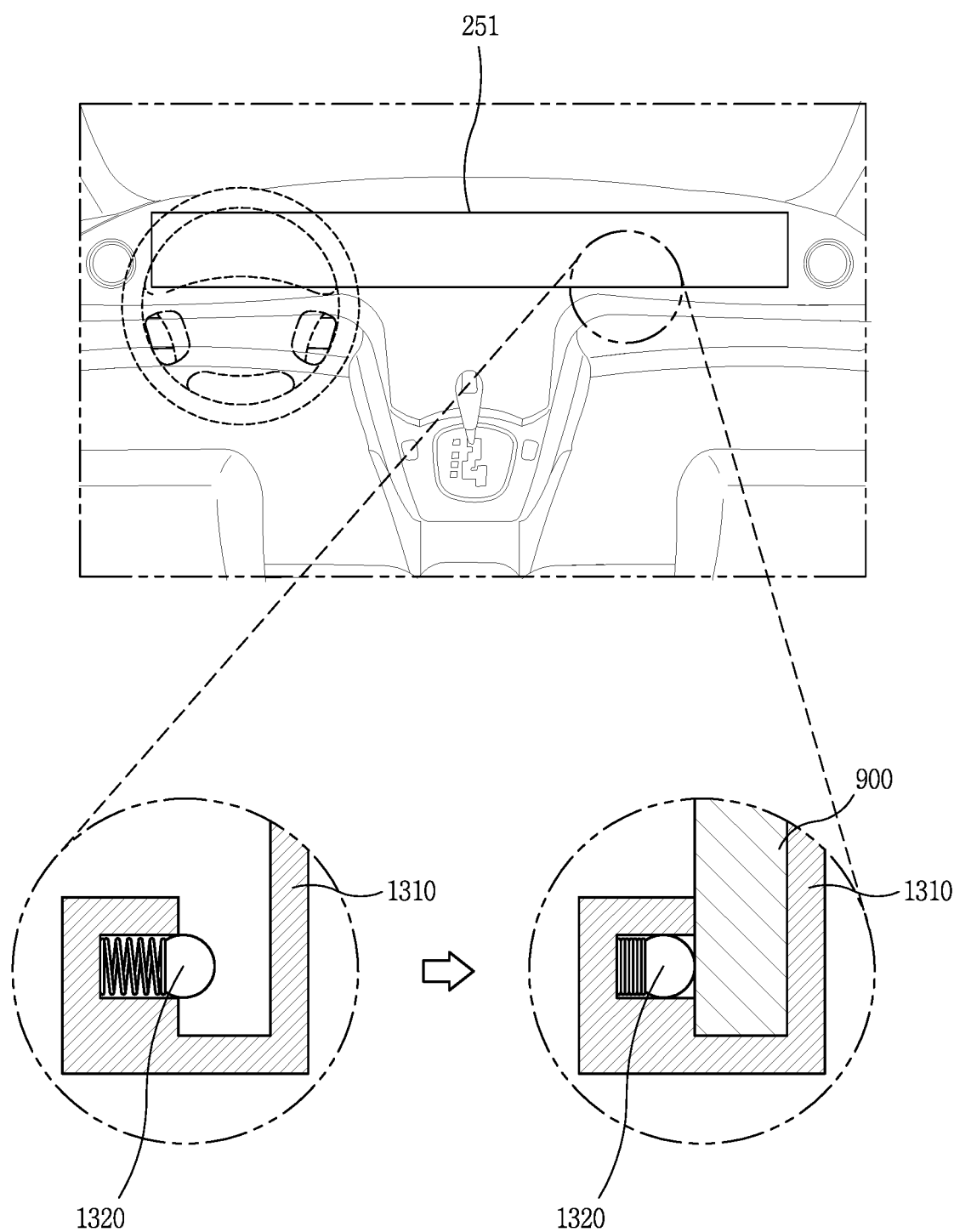
FIGS. 13A and 13B are diagrams for describing an example of the cradle in FIG. 12 in more detail.

First, with reference to FIG. 13A, a display unit 251 is installed in the vehicle 100, and the cradle 1310 into which the terminal 900 is inserted to be held in place is connected to one end of the display unit 251.

The cradle 1310 includes a first portion, a second portion, and a third that connects the first and second portions to each other. The first portion is exposed to the outside and a front-surface portion of the terminal 900 is brought into contact with the first portion. A rear-surface portion of the terminal 900 is brought into contact with the second portion. The third portion limits movement of the terminal 900 in such a manner that the terminal 900 is not slid in the direction of gravity.

The terminal 900 is slidably moved in one direction for insertion between the first portion and the second portion, and is placed in the third portion or is supported by the third portion.

The first portion is formed in such a manner that it does not cover a screen display area of the terminal 900. For example, the width of the first portion is 20 mm to 50 mm. This corresponds to a size of a bezel area of the terminal 900.

The terminal 900 in a state of being placed in the cradle 1310 is slidably moved leftward and rightward toward the leftmost end or rightmost end of the display unit 251.

On the other hand, the cradle 1310 further includes holding portions 1320 and 1330 that are configured to hold the terminal 900 in place to be positioned at a proper position when the terminal 900 is inserted.

As an example, as illustrated in FIG. 13A, the holding portion 1320 is formed on the first portion of the cradle 1310, and has such elasticity that pressure is automatically applied to the terminal 900 when the terminal 900 is inserted. The holding portion 1320 holds the terminal 900 in place using its elasticity.

Figure 13B:
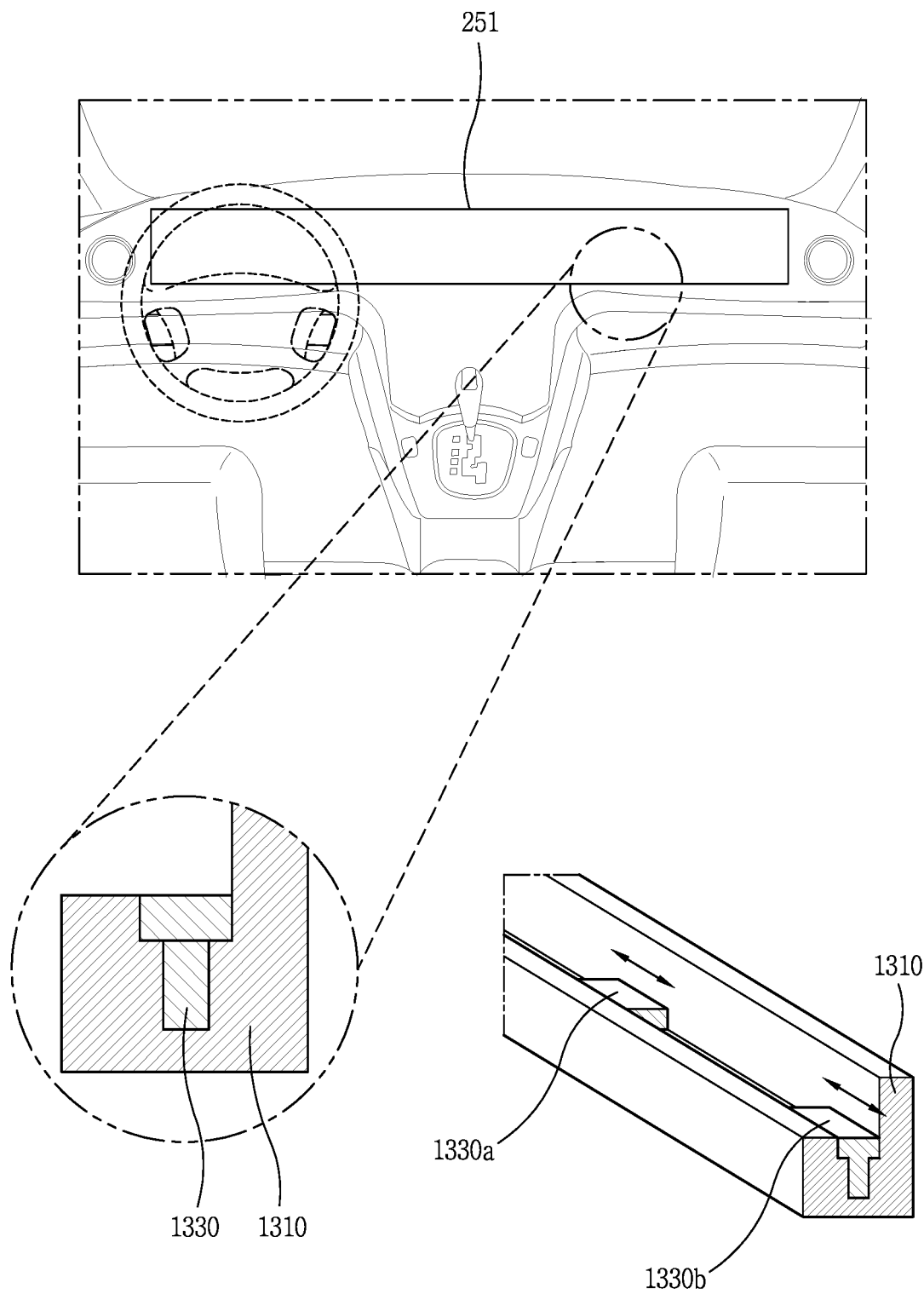

As another example, as illustrated in FIG. 13B, the holding portion 1330 is formed in the third portion of the cradle 1310, and is configured to be slidably moved along a rail. The holding portion 1330 includes a first holding portion 1330*a* and a second holding portion 1330*b* are slidably moved independently of each other. In a case where the terminal 900 is placed in the cradle 1310, the first and second holding portions 1330*a* and 1330*b* applies pressure to both ends of the terminal 900, respectively, in opposite directions. With the pressure that is applied in opposite directions, the terminal 900 is held in place in the cradle 1310.

With reference to FIG. 12, the processor 830 detects that the terminal 900 is placed in the cradle 1310 (S1210).

For example, in a case where a wireless charging unit that is positioned on the rear surface of the display unit 251 and supplies power wirelessly to the terminal 900 is activated, the processor 830 determines that the terminal 900 is placed in the cradle 1310.

As another example, it is detected whether or not the terminal 900 is placed, in various cases, such as a case where the holding unit 1320 applies pressure and a case where it is detected that the terminal 900 is detected from an image of the display unit 251, which is captured by a camera.

In a case where the terminal 900 is placed in the cradle 1310, the processor 830 controls the holding portions 1320 and 1330 in such a manner that the holding portions 1320 and 1330 hold the terminal 900 in place (S1230).

For example, in a case where the holding portion 1320 has electricity, the holding portion 1320 exerts an external force in one direction on the terminal 900. Furthermore, in a case where the holding portion 1330 is slidably moved, the first and second holding portions of the holding portion 1330 are moved in opposite directions. An actuator that exerts an external force is further included in the fixation portion in order for the holding portions 1320 and 1330 to hold the terminal 900 in place.

Next, the processor 830 controls the holding portion in such a manner that the terminal 900 is kept held in place while the autonomous traveling command is being generated (S1250).

More specifically, before the autonomous traveling command is generated, the holding portion is controlled in such a manner that an external force which has a first size is exerted. However, in a case where the autonomous traveling command is generated, the holding portion is controlled in such a manner that an external force which has a second size greater than the first size is exerted.

This is in order to prevent the user from arbitrarily releasing the terminal 900 from the cradle 1310.

On the other hand, the processor 830 selectively generates the autonomous traveling command, according to whether or not the terminal 900 that performs the car mode is held in place by the holding portion.

For example, when the terminal 900 is not held in place by the holding portion, the autonomous traveling command is not generated. Only when the terminal 900 is held in place by the holding portion, the autonomous traveling command is generated.

While the autonomous traveling command is being generated, when the terminal 900 that is held in place by the holding portion is released and thus, is no longer held in place by the holding portion, the processor 830 finishes generating the autonomous traveling command. That is, the vehicle that travels autonomously changes a traveling mode to the manual traveling.

When the terminal 900 is held in place by the holding portion during the manual traveling, the processor 830 limits the generation of the autonomous traveling command in order for the vehicle not to travel autonomously.

The processor 830 controls the proximity communication module 810 in order that the terminal 900 is kept held in place by the holding portion while the autonomous traveling command is being generated. That is, a control command that causes the holding portion to exert a predetermined force on the terminal 100 is transmitted to the holding portion through the proximity communication module 810.

FIG. 14 is a diagram illustrating an example of operations that are performed in a case where the terminal is placed in the cradle in FIG. 12.

The display unit 251 includes at least one of the following: a driver seat region 251*a*, a navigation region 251*b*, and a front right seat region 251*e*. The driver seat region 251*a* provides dashboard information to the driver. The navigation region 251*b* guides a person who rides in the vehicle to a path to a destination. The front right seat region 251*e* provides various pieces of information to a person who sits on a front right seat.

The cradle 1310 that is described above with reference to FIGS. 13A and 13B is installed in a lower end of the display unit 251. In a case where the terminal 900 is placed in the cradle 1310, the processor 830 detects that the terminal 900 is placed in the cradle 1310. Then, the proximity communication module 810 is controlled in such a manner that the terminal 900 performs the car mode.

Based on information that is received from the selected terminal 900, the processor 830 calculates the available autonomous traveling time for which the autonomous traveling by the vehicle is possible using the selected terminal 900. The processor 830 controls the proximity communication module 810 in such a manner that time information indicating the calculated time is output to the display unit 251 that is installed in the vehicle 100, or to the terminal 900.

The available autonomous traveling time varies according to at least one of the following: an amount of available data and an amount of available batter power in the terminal 900.

The terminal 900 outputs an execution screen that corresponds to the car mode, to a display 951 of the terminal 900 itself, when the car mode is performed. For example, the available autonomous traveling time (for example, three hours and thirty minutes) is displayed on the execution screen.

On the other hand, the terminal that provides information to the vehicle control device 800 is changed from the first terminal to the second terminal. In this case, the processor 830 recalculates the available autonomous traveling time based on information that is provided by the second terminal, and the time information with the recalculated available autonomous traveling time.

In a case where the pre-defined state where information is not received from the selected terminal is detected while the vehicle 100 is traveling autonomously, the processor 830 may control the proximity communication module 810 in such a manner that alert information which alerts that the autonomous traveling is finished is output to the display unit 251 that is installed in the vehicle 100 or to the display 951 of the terminal 900.

Figure 15A:
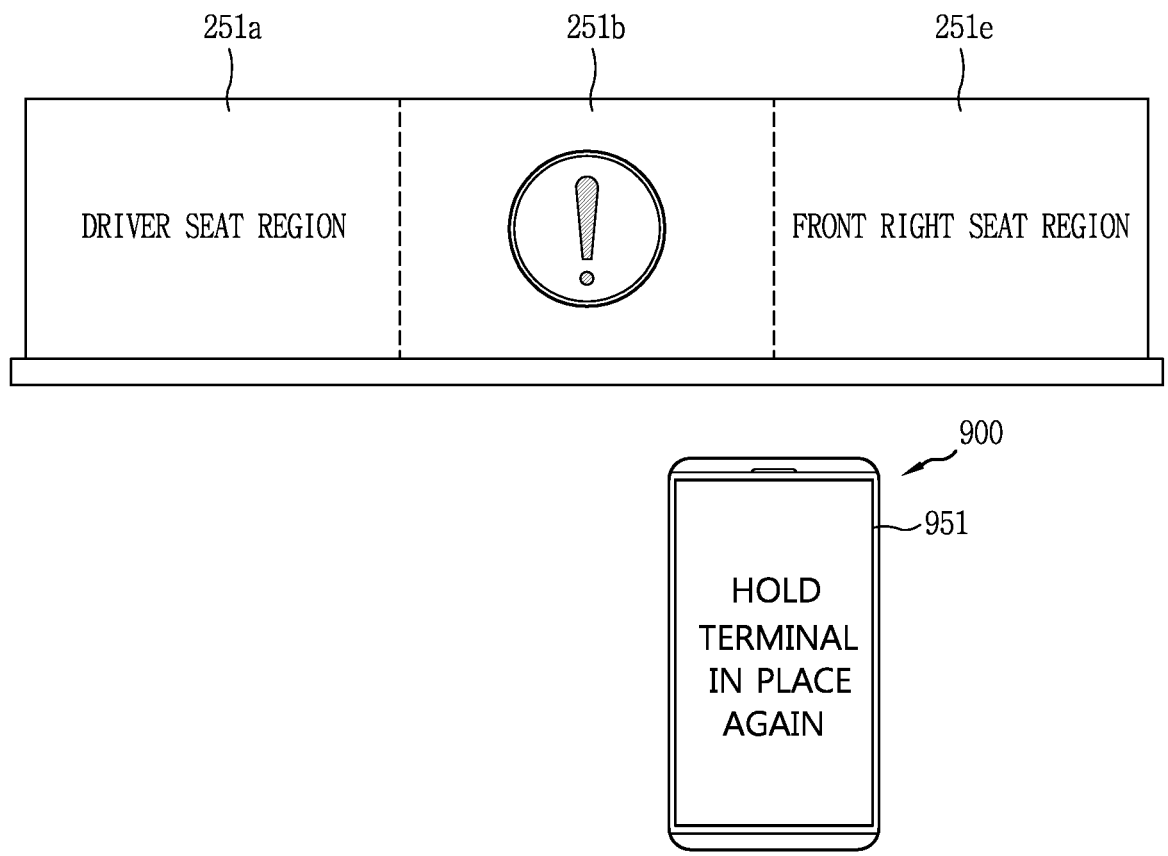

FIGS. 15A and 15B are diagrams for describing an example of operations that are performed in a case where the terminal that is placed in the cradle is released from the cradle.

In a state where the terminal 900 is held in place by the holding portion, the terminal 900 performs the car mode, and the vehicle control device 800 generates the autonomous traveling command using information that is received through the terminal 900. Subsequently, the terminal 900 is released from the cradle 1310.

In this case, as illustrated in FIG. 15A, the processor 830 controls the proximity communication module 810 in such a manner that warning information which warns that the terminal 900 has to be held in place by the holding portion is output to the display unit 251 that is installed in the vehicle 100 or to the display 951 of the terminal 900.

Alternatively, as illustrated in FIG. 15B, the processor 830 may control the proximity communication module 810 in such a manner that the available autonomous traveling time is output to the display unit 251 that is installed in the vehicle 100.

FIG. 16 is a diagram for describing an example of operations that are performed in a case where a state that is pre-defined is detected in the terminal that operates as the communication module of the vehicle.

With reference to FIG. 16, the terminal 900 alerts the available autonomous traveling time.

The processor 830 generates the autonomous traveling command using the terminal 900.

In a case where the pre-defined state where information is not received from the terminal 900 is detected while the vehicle 100 is traveling autonomously, the processor 830 controls the proximity communication module 810 in such a manner that the alert information which alerts that the autonomous traveling is finished is output to the display unit 251 that is installed in the vehicle 100 or to the display 951 of the terminal 900. The alert information includes the time that it takes for the autonomous traveling to be finished, and the time is counted.

Figure 17:
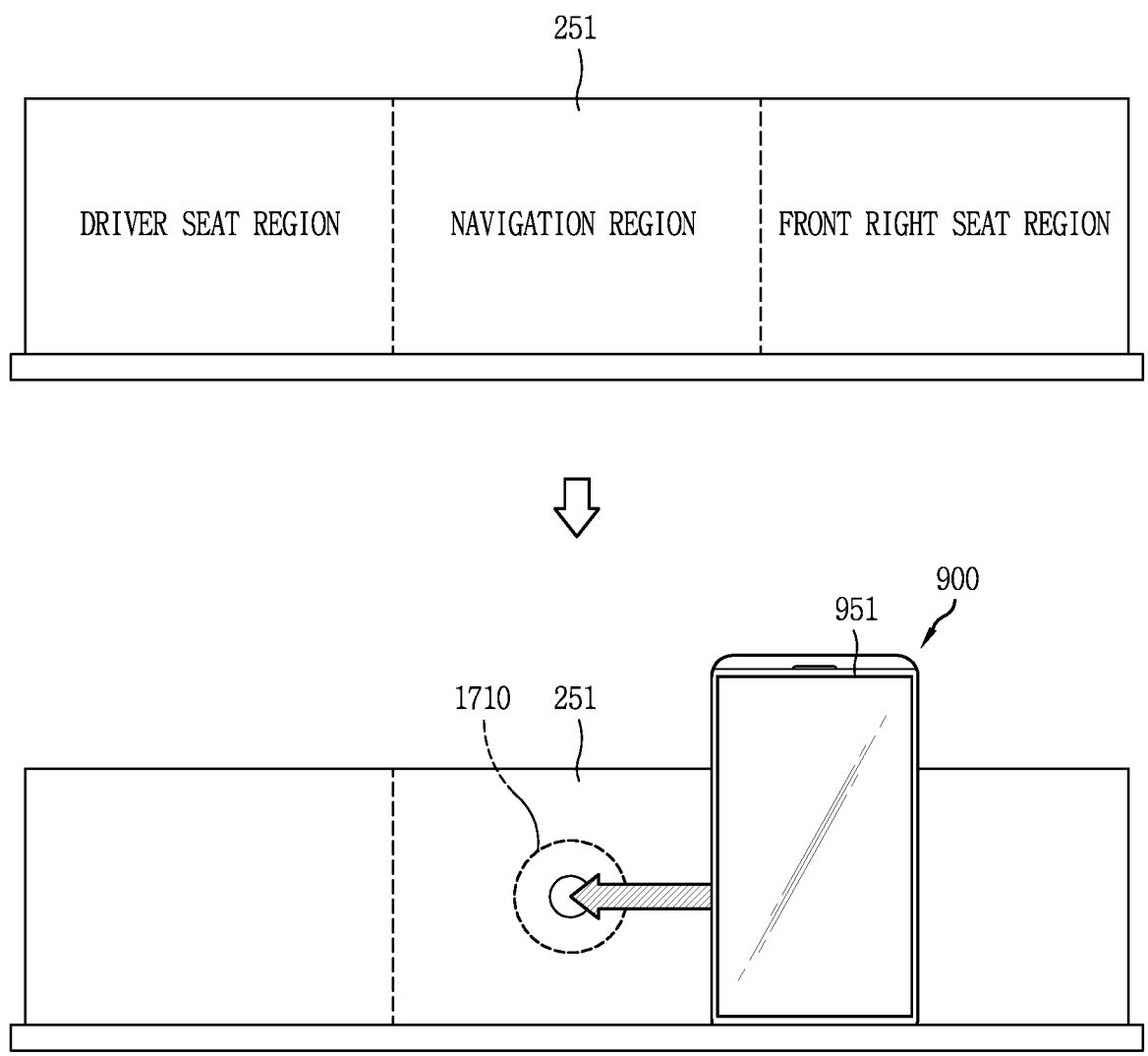
FIG. 17 is a diagram for describing an example of a method of guiding a position in which the terminal is placed.

FIG. 17 is a diagram for describing an example of a method of guiding a position in which the terminal is placed.

The processor 830 detects that the terminal 900 is placed in the cradle 1310. In a case where the wireless charging unit that supplies power to the terminal 900 is installed in the rear surface of the display unit 251, the user is alerted of a predetermined position in which the efficiency of the wireless charging by the wireless charging unit is higher than a reference. For example, as illustrated in FIG. 17, predetermined position guiding information 1710 is output to the display unit 251.

The predetermined position varies according to a type of the terminal. This is because a shape and a size that are required for the wireless charging vary from one terminal to another. For this reason, based on information that is received from the terminal 900, the processor 830 calculates the predetermined position.

As illustrated in FIG. 13B, in a case where the holding portion is configured to be slid, the processor 830 moves the holding portion in such a manner that the terminal 900 is moved to the predetermined position. As the holding portion is moved, the terminal 900 that is placed in the cradle 1310 is moved.

Figure 18A:
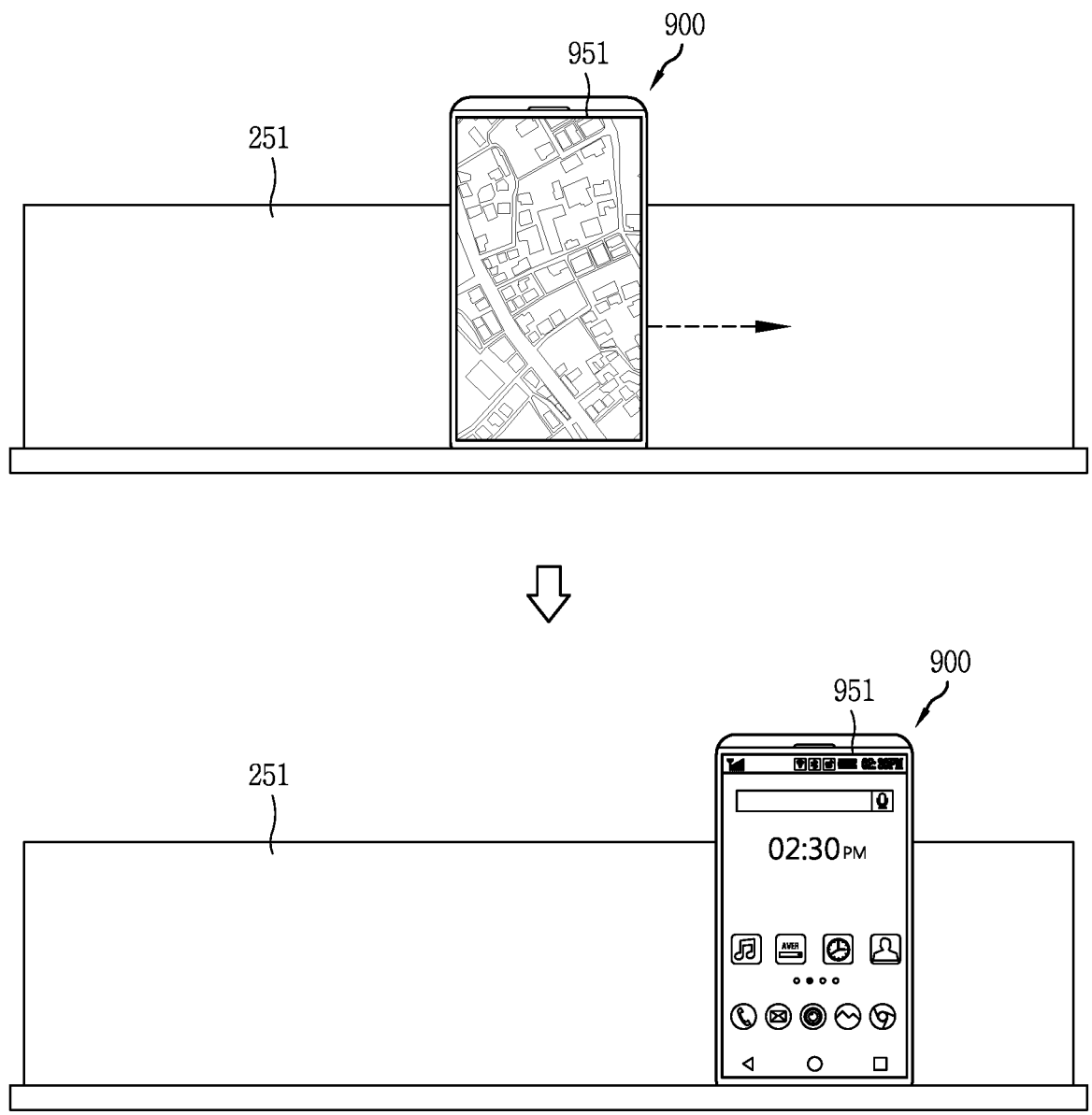

FIGS. 18A and 18B are diagrams for describing an example of a method of controlling the terminal in different ways according to the position in which the terminal is placed.

The display unit 251 includes at least one of the following: the driver seat region 251a, the navigation region 251b, and the front right seat region 251e. The terminal 900 operates in a way that varies according to which one of the regions described above the terminal 900 is placed in.

For example, in a case where the terminal 900 is placed in the navigation region 251b, the car mode is performed, but in a case where the terminal 900 is placed in the front right seat region 251e, the car mode is not performed. This is because, in a case where the terminal 900 is placed in the front right seat region 251e, the person sitting on the front right seat uses the terminal 900 and thus a resource is difficult to manage.

As another example, in a case where the terminal 900 is placed in a region in which the wireless charging is possible, the car mode is performed, but in a case where the terminal 900 is placed in a region in which the wireless charging is impossible, the car mode is not performed. This is because battery power consumption due to data communication causes the terminal to be powered off.

In a case where the terminal 900 is moved from the region in which the wireless charging is possible to the region in which the wireless charging is impossible, the car mode is maintained, but the display 951 of the terminal 900 is powered off. In other words, in a case where the terminal 900 is placed in the region in which the wireless charging is impossible, the car mode is performed, but the display 951 of the terminal 900 is not powered on. This is in order to manage a resource of the terminal 900 within a range where prediction is possible.

As illustrated in FIG. 18A, in a case where the terminal 900 is positioned in the navigation region 251b, one portion (which is referred to as a "first screen") of the information that is received from the communication device 1000 is output to the display 951 of the terminal 900. Subsequently, in a case where the terminal 900 is slidably moved to the front right seat region 251e, a second screen that is used by the person sitting on the front right seat is output to the display 951 of the terminal 900.

On the other hand, as illustrated in FIG. 18B, in a case where the terminal 900 is positioned in the front right seat region 251e, various screens for the person sitting on the front right seat, such as a screen for reproducing a moving image, are output to the display 951 of the terminal 900. Subsequently, in a case where the terminal 900 is slidably moved to the navigation region 251b, a function that is being performed is interrupted or temporarily suspended. Because this causes driver distraction, the function is interrupted or temporarily suspended.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device for a vehicle that includes a display, comprising:
   a proximity communication interface configured to communicate with a plurality of terminals that are located inside of the vehicle; and
   at least one processor configured to:
      select a first terminal from among the plurality of terminals according to a preset reference, the first terminal comprising a first wide area communication interface configured to communicate with an external device located outside of the vehicle,
      control the proximity communication interface to enable communication between the first terminal and the external device through the first wide area communication interface, and
      based on an amount of data per unit time that is communicated through the first wide area communication interface during the communication between the first terminal and the external device exceeding a threshold, control the proximity communication interface to enable both the first wide area communication interface and a second wide area communication interface of a second terminal to communicate with the external device, the second terminal being included in the plurality of terminals and different from the first terminal and comprising the second wide area communication interface.

2. The vehicle control device of claim 1, wherein the at least one processor is further configured to:
   detect a pre-defined state in which the first terminal is unable to perform communication with the external device, and
   in response to detecting the pre-defined state, control the proximity communication interface to switch communication with the external device from the first wide area communication interface to the second wide area communication interface.

3. The vehicle control device of claim 2, wherein the at least one processor is further configured to control the proximity communication interface to enable the second terminal to perform a function that the first terminal has performed.

4. The vehicle control device of claim 3, wherein the at least one processor is further configured to, before the second terminal performs the function that the first terminal has performed, control the proximity communication interface to transmit, to the second terminal, information received through the first terminal.

5. The vehicle control device of claim 2, wherein the at least one processor is further configured to, based on a cessation of the pre-defined state, control the proximity communication interface to switch communication with the external device from the second wide area communication interface to the first wide area communication interface.

6. The vehicle control device of claim 2, wherein the at least one processor is further configured to control the proximity communication interface to restrict the second terminal from performing at least one function.

7. The vehicle control device of claim 1, wherein the at least one processor is further configured to:
   identify the amount of data per unit time that is communicated through the first wide area communication interface.

8. The vehicle control device of claim 1, wherein the at least one processor is further configured to assign a communication identifier to the first terminal or the second terminal.

9. The vehicle control device of claim 1, wherein the at least one processor is further configured to control the proximity communication interface to interrupt at least one function that the first terminal performs.

10. The vehicle control device of claim 1, wherein the at least one processor is further configured to:
    select a terminal from among the plurality of terminals based on a first reference for performing a first function; and
    select another terminal from among the plurality of terminals based on a second reference for performing a second function that is different from the first function.

11. The vehicle control device of claim 1, wherein the at least one processor is further configured to, based on information received from the first terminal, generate an autonomous traveling command that causes the vehicle to travel autonomously.

12. The vehicle control device of claim 11, wherein the at least one processor is further configured to:
    based on the information received from the first terminal, determine an autonomous travel time that is available for the vehicle to travel autonomously using the first terminal; and
    control the display to output time information corresponding to the autonomous travel time.

13. The vehicle control device of claim 12, wherein the at least one processor is further configured to:

switch selection of terminal from the first terminal to the second terminal from among the plurality of terminals;

in response to switching selection of terminal from the first terminal to the second terminal, re-determine an autonomous travel time based on information received from the second terminal; and control the display to output updated time information corresponding to the re-determined autonomous travel time.

14. The vehicle control device of claim 11, wherein the at least one processor is further configured to:

based on the vehicle traveling autonomously, detect a pre-defined state in which the first terminal is unable to transmit information;

based on a detection of the pre-defined state, control the display to output alert information indicating a cessation of autonomous traveling.

15. The vehicle control device of claim 14, wherein the pre-defined state comprises a state in which the first terminal has used an amount of data that is greater than or equal to a reference value set for the first terminal.

16. The vehicle control device of claim 11, wherein the at least one processor is further configured to selectively generate the autonomous traveling command based on whether the first terminal is placed in a cradle that is configured to hold the plurality of terminals.

17. The vehicle control device of claim 16, wherein the at least one processor is further configured to, based on generation of the autonomous traveling command, control the proximity communication interface to cause the cradle to hold the first terminal at a position in the cradle.

18. The vehicle control device of claim 16, wherein the at least one processor is further configured to, based on the first terminal being placed outside of the cradle, control the display to output warning information indicating a lack of the first terminal in the cradle.

19. The vehicle control device of claim 11, wherein the at least one processor is further configured to, based on generation of the autonomous traveling command, control the proximity communication interface to restrict the first terminal from performing at least one function.

20. The vehicle control device of claim 1, wherein the at least one processor is further configured to select the first terminal from among the plurality of terminals based on a communication speed of each terminal, an amount of data available to each terminal, or an amount of battery power available to each terminal.

* * * * *